(12) United States Patent
Brusatore

(10) Patent No.: US 7,533,493 B2
(45) Date of Patent: May 19, 2009

(54) METHOD AND APPARATUS FOR GROWING PLANTS

(75) Inventor: Nicholas Gordon Brusatore, Port Moody (CA)

(73) Assignee: Terrasphere Systems LLC, Boston, MA (US)

( * ) Notice: Subject to any disclaimer, the term of this patent is extended or adjusted under 35 U.S.C. 154(b) by 154 days.

(21) Appl. No.: 11/791,851

(22) PCT Filed: Mar. 7, 2006

(86) PCT No.: PCT/US2006/007945

§ 371 (c)(1),
(2), (4) Date: May 30, 2007

(87) PCT Pub. No.: WO2006/096650

PCT Pub. Date: Sep. 14, 2006

(65) Prior Publication Data

US 2008/0110088 A1    May 15, 2008

Related U.S. Application Data

(63) Continuation-in-part of application No. 11/073,562, filed on Mar. 8, 2005, now Pat. No. 7,415,796.

(30) Foreign Application Priority Data

Mar. 7, 2005    (CA) .................................... 2499512

(51) Int. Cl.
*A01G 9/02* (2006.01)
*A01G 31/00* (2006.01)

(52) U.S. Cl. ............................... 47/82; 47/83; 47/59 R; 47/62 R

(58) Field of Classification Search ........... 47/59 R–63, 47/17, 18, 65, 65.5, 57, 85, 48.5, 79–83, 47/1.3, 66.5, 67, 39
See application file for complete search history.

(56) References Cited

U.S. PATENT DOCUMENTS 1,500,917 A    7/1924    Bell (Continued)

FOREIGN PATENT DOCUMENTS

CA    2343254 C    3/2002

(Continued)

OTHER PUBLICATIONS

PCT International Search Report and the Written Opinion dated May 8, 2007 (10 pp.).

(Continued)

*Primary Examiner*—Andrea M Valenti
(74) *Attorney, Agent, or Firm*—Dinesh Agarwal, P.C.; John E. Lynch, Esq.

(57) ABSTRACT

Method and apparatus for growing plants wherein a spherical array of seeds or seedlings radially face the center of the sphere and a growth promoting light source is generally at the center of the sphere; plant growth is promoted and approximately equal weight distribution among growing plants is maintained by rotating the sphere on its horizontal axis around the light source, simultaneously delivering water optionally containing plant nutrients to all the seeds or seedlings and regulating the light source during periods of plant growth and non-growth.

17 Claims, 22 Drawing Sheets

U.S. PATENT DOCUMENTS

| | | | |
|---|---|---|---|
| 3,254,447 A | 6/1966 | Ruthner |
| 3,339,308 A | 9/1967 | Clare |
| 3,529,379 A | 9/1970 | Ware |
| 3,667,157 A | 6/1972 | Longhini |
| 3,747,268 A | 7/1973 | Linder |
| 3,909,978 A | 10/1975 | Fleming |
| 3,973,353 A | 8/1976 | Dedolph |
| 4,085,544 A | 4/1978 | Blake |
| 4,255,897 A | 3/1981 | Ruthner |
| 4,356,664 A | 11/1982 | Ruthner |
| 5,157,869 A | 10/1992 | Minton |
| 5,165,364 A | 11/1992 | Horkey |
| 5,372,474 A | 12/1994 | Miller |
| 5,515,648 A | 5/1996 | Sparkes |
| 5,584,141 A | 12/1996 | Johnson |
| 5,617,673 A | 4/1997 | Takashima |
| 5,862,628 A | 1/1999 | Takashima |
| 6,378,246 B1 | 4/2002 | DeFoor |
| 6,394,030 B1 | 5/2002 | Geiger et al. |
| 6,557,491 B1 | 5/2003 | Weiser et al. |
| 6,604,321 B2 | 8/2003 | Marchildon |
| 6,766,817 B2 | 7/2004 | da Silva |
| 6,837,002 B2 | 1/2005 | Costa |
| 6,840,007 B2 | 1/2005 | Leduc et al. |
| 6,918,404 B2 | 7/2005 | Dias da Silva |
| 6,928,772 B2 | 8/2005 | Bai et al. |
| 6,951,076 B2 | 10/2005 | Winsbury |
| 6,983,562 B2 | 1/2006 | Sanderson |
| 7,066,586 B2 | 6/2006 | da Silva |
| 7,143,544 B2 | 12/2006 | Roy |
| 7,168,206 B2 | 1/2007 | Agius |
| 7,181,886 B2 | 2/2007 | Bourgoin et al. |
| 7,188,451 B2 | 3/2007 | Marchildon |
| 7,285,255 B2 | 10/2007 | Kadlec et al. |
| 7,401,437 B2 | 7/2008 | Dumont |
| 7,488,098 B2 | 2/2009 | Dumont |
| 2002/0144461 A1 | 10/2002 | Marchildon |
| 2004/0111965 A1 | 6/2004 | Agius |
| 2004/0163308 A1 | 8/2004 | Uchiyama |
| 2005/0011119 A1 | 1/2005 | Bourgoin et al. |
| 2005/0039396 A1 | 2/2005 | Marchildon |
| 2005/0039397 A1 | 2/2005 | Roy |
| 2005/0055878 A1 | 3/2005 | Dumont |
| 2005/0257424 A1 | 11/2005 | Bissonnette et al. |
| 2006/0150481 A1 | 7/2006 | Hung et al. |
| 2006/0230674 A1 | 10/2006 | Marchildon |
| 2006/0272210 A1 | 12/2006 | Bissonnette et al. |
| 2007/0141912 A1 | 6/2007 | Dumont |
| 2007/0212281 A1 | 9/2007 | Kadlec et al. |
| 2007/0271842 A1 | 11/2007 | Bissonnette et al. |
| 2008/0015531 A1 | 1/2008 | Hird et al. |
| 2008/0222949 A1 | 9/2008 | Bissonnette et al. |

FOREIGN PATENT DOCUMENTS

| | | |
|---|---|---|
| CA | 2396317 A1 | 8/2002 |
| CA | 2412073 A1 | 5/2004 |
| CA | 2503705 C | 6/2004 |
| CA | 2431523 A1 | 9/2004 |
| CA | 2536116 A1 | 2/2005 |
| FR | 2240684 | 3/1975 |
| FR | 2345912 | 10/1977 |
| FR | 2680074 A1 | 2/1993 |
| GB | 2269304 A | 2/1994 |
| JP | 4229111 A | 8/1992 |
| JP | 2001128571 A | 5/2001 |
| RU | 2034448 C | 5/1995 |
| SU | 420288 | 3/1974 |
| SU | 650557 | 3/1979 |
| SU | 914004 B | 3/1982 |
| SU | 1722301 A1 | 3/1992 |

OTHER PUBLICATIONS

PCT International Search Report and the Written Opinion in International App. No. PCT/US08/06416, dated Sep. 29, 2008 (9 pp.).

Derwent Abstract Accession No. 93-065376/08, SU 1722301 A1 (Bozhok) Mar. 30, 1992 (2 pp.).

International Preliminary Examination Report for PCT/AU02/00097, dated Apr. 30, 2002 (6 pp.).

PCT International Search Report for International App. No. PCT/AU02/00097, dated Mar. 1, 2002 (2 pp.).

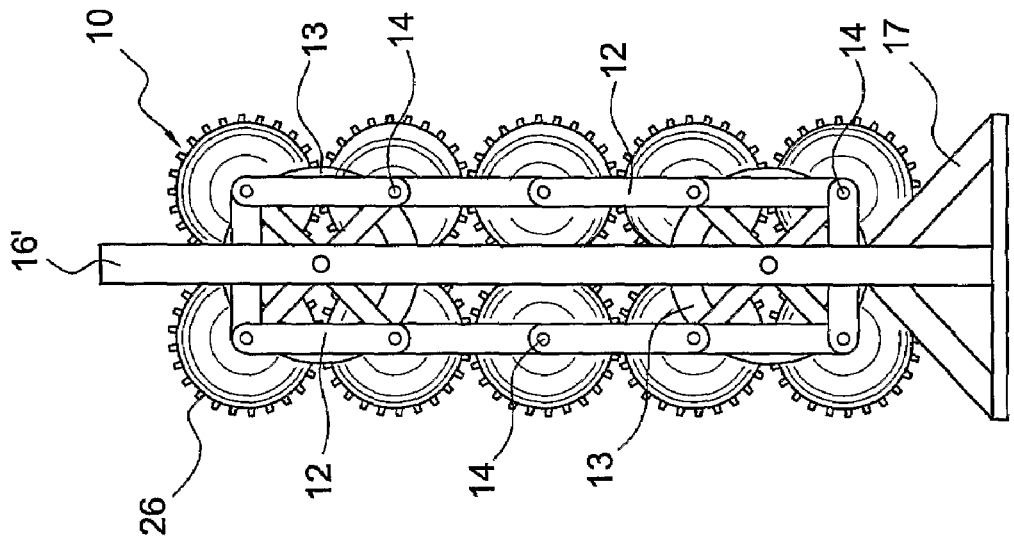
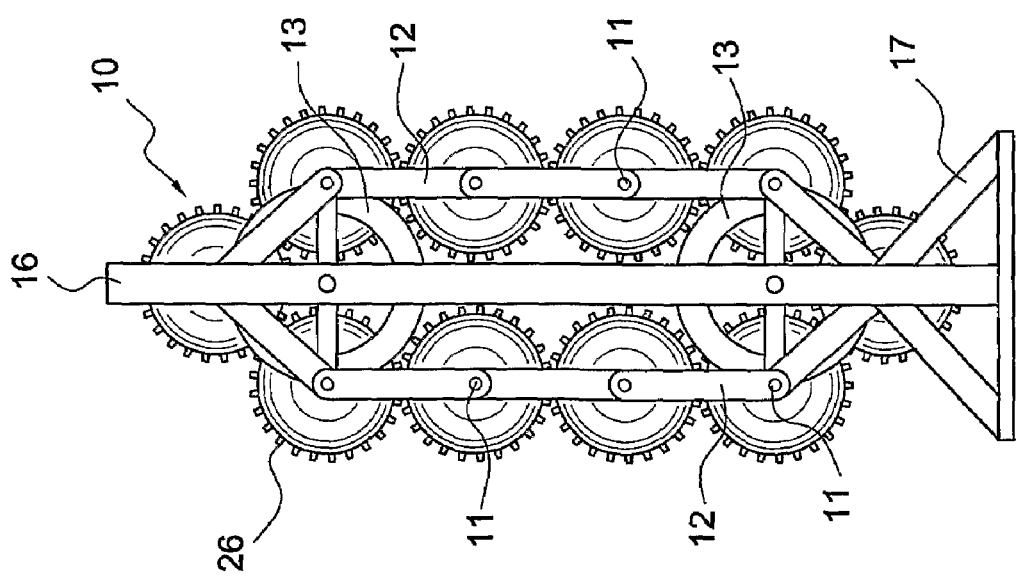

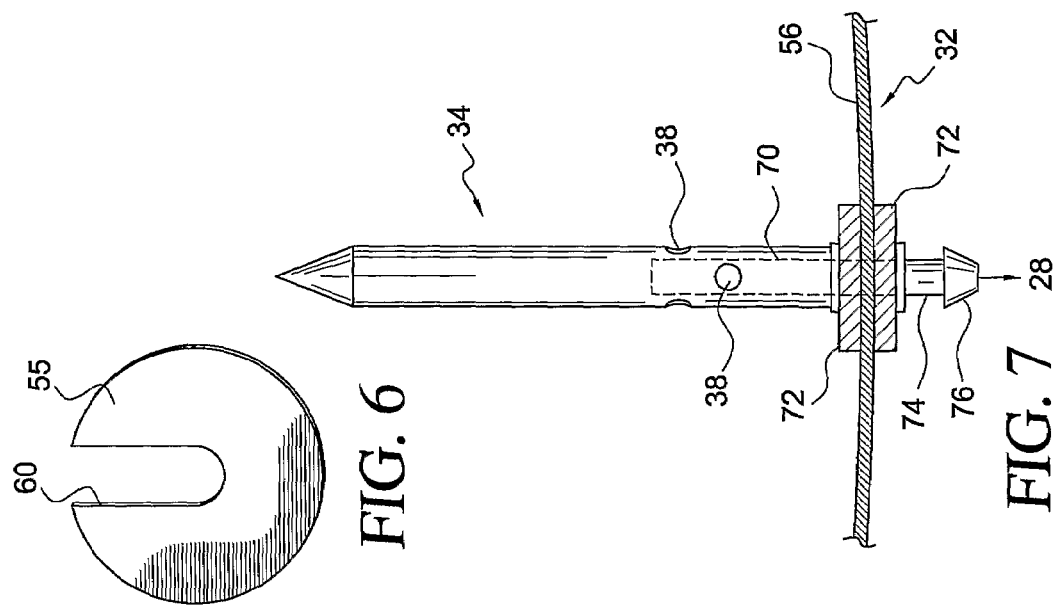
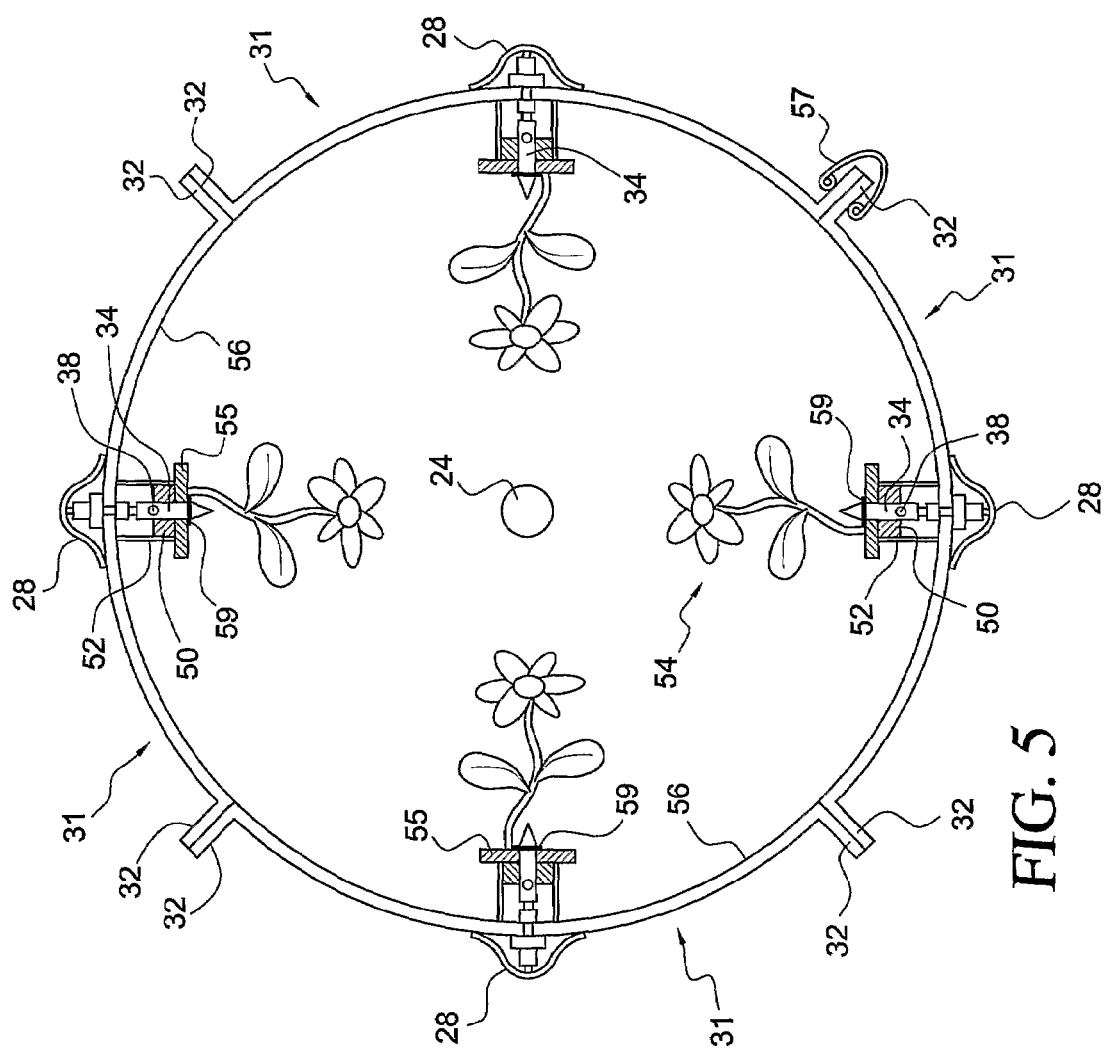

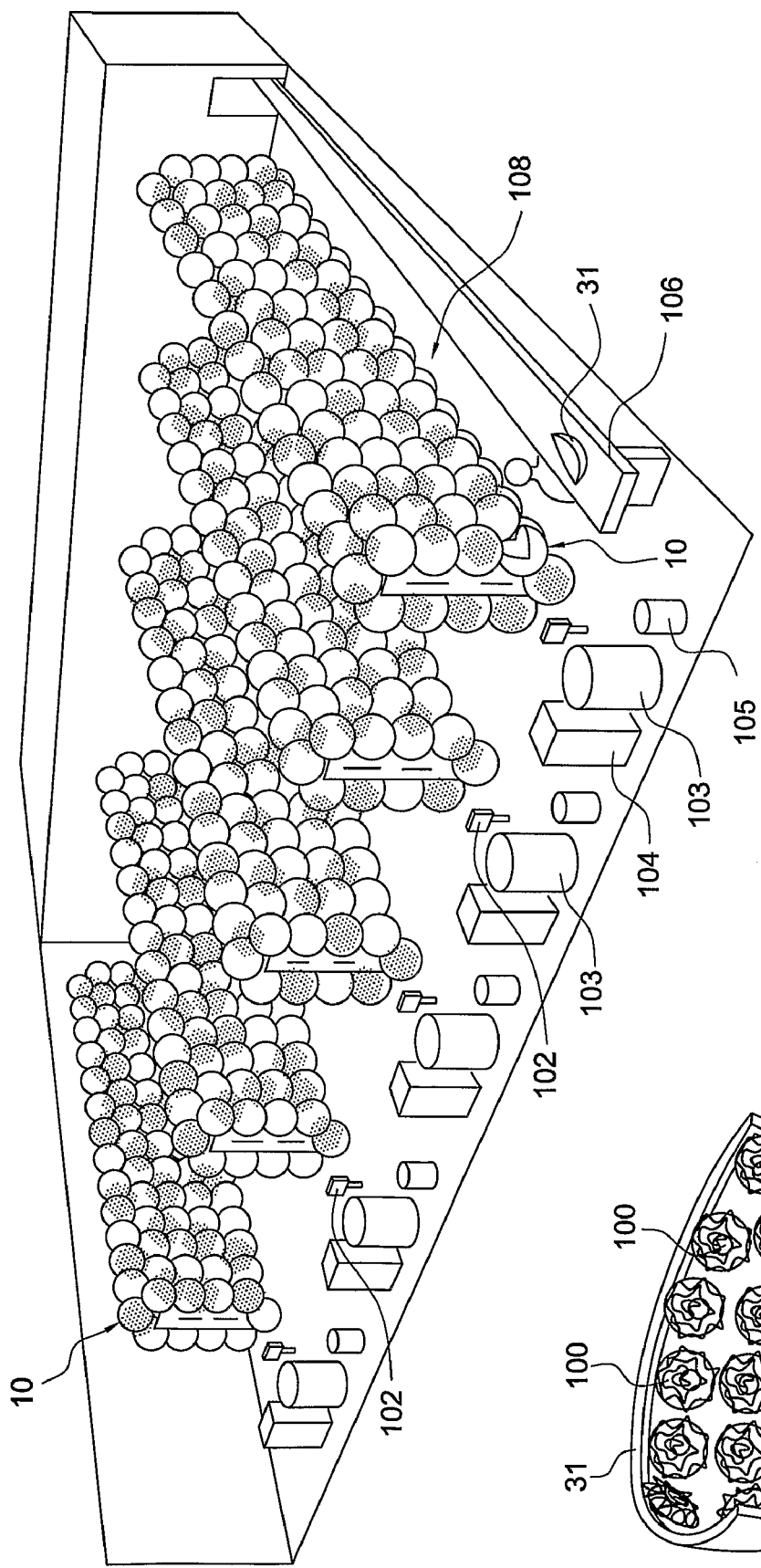

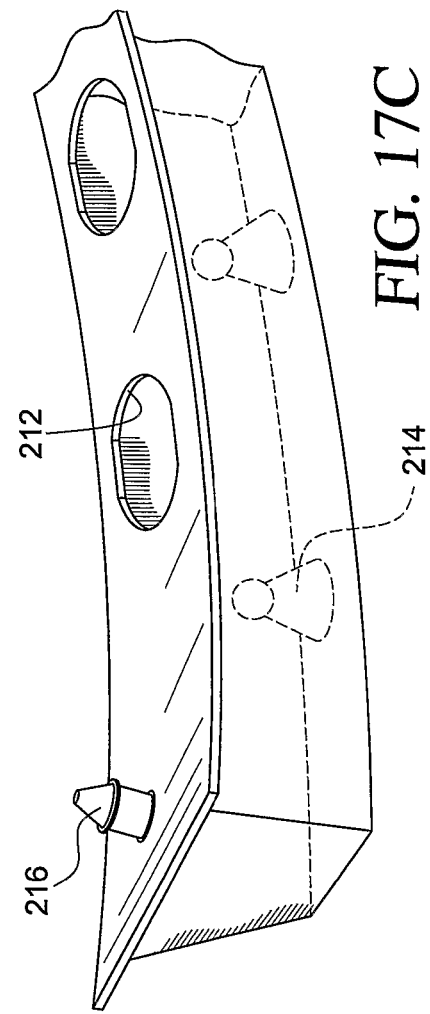
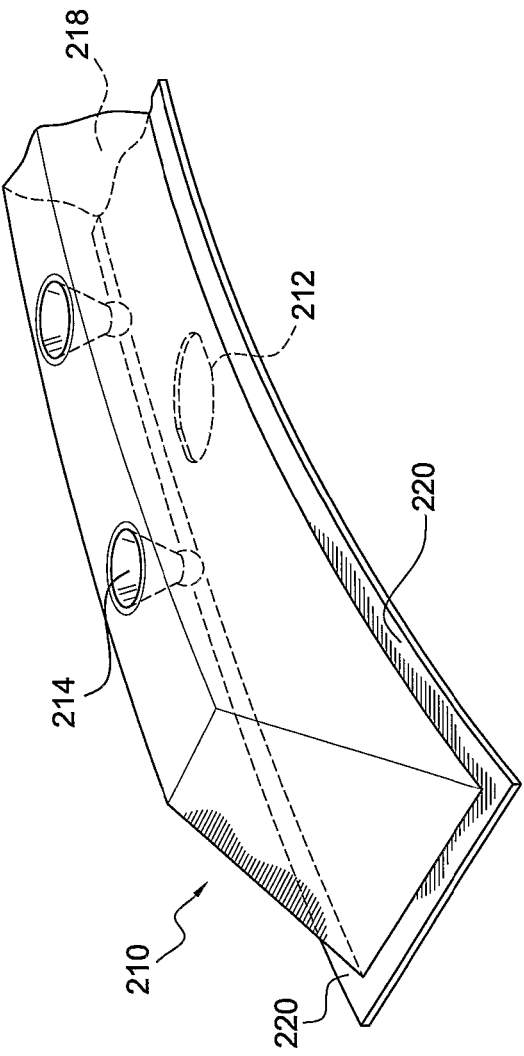
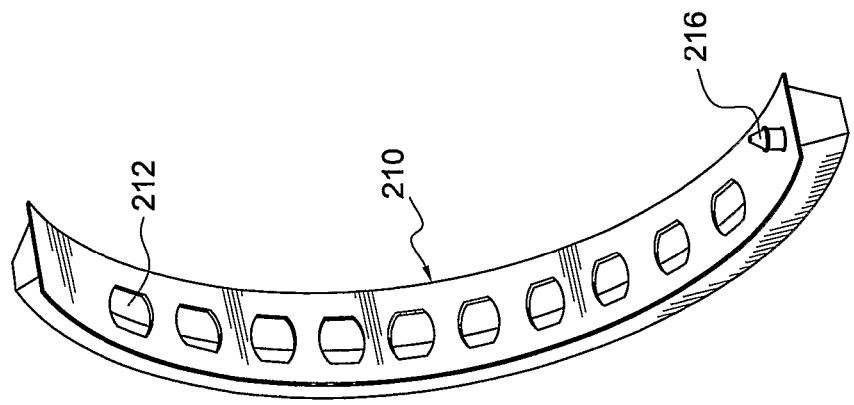

METHOD AND APPARATUS FOR GROWING PLANTS

CROSS-REFERENCE TO RELATED APPLICATIONS

This is a continuation-in-part of application Ser. No. 11/073,562, filed Mar. 8, 2005, now U.S. Pat. No. 7,415,796 which is incorporated herein in its entirety by reference.

FIELD OF THE INVENTION

This invention relates to method and apparatus for growing plants in a controlled setting using and precisely controlling combinations of light, water, nutrition, gravity, centrifugal forces and temperature to produce ideal growing conditions resulting in maximum possible plant growth and crop production.

SUMMARY OF THE INVENTION

The invention provides a highly efficient system that can grow a variety of commercially desirable crops in simple, compact, automated facilities. The volume of crops that can be grown in a given space is increased by a factor of four in a preferred embodiment compared to traditional methods. The invention creates a highly controlled environment that is suitable for significantly enhancing plant growth in places where it was previously not feasible because of economic or environmental constraints. Environmentally, the invention uses significantly less water than traditional methods and avoids problems associated with the disposal of nutrient solutions and growth media. The invention can be used to grow a variety of crops, including leafy vegetables, green vegetables, herbs, medicinal plants, fruits and berries.

The invention provides rotating spheres that hold rows of plants growing towards to a light source at the center of each sphere. A precision nutrient supply system promotes rapid and efficient plant growth. Carousels hold multiple spheres in two vertical columns and rotate the spheres while providing interconnection with the nutrient supply system. Carousels are set up side-by-side in rows with an adjacent conveyor belt for planting and harvesting.

In operation, spheres are populated with seeds or seedlings and managed through a prescribed grow-out regime that includes nutrient application, inspection and testing, quality control and, when needed, intermediate treatments (thinning, culling, pollination, pest control). Mature crops are harvested, and post-harvest maintenance, such as cleaning, prepares the spheres for another production cycle.

The invention thus provides a method for growing plants which includes the steps of:
(a) providing a spherical array of seeds or seedlings that radially face the center of the sphere;
(b) providing a growth promoting light source generally at the center of the spherical array;
(c) maintaining approximately equal weight distribution among plants growing towards the light source by rotating the spherical array on its horizontal axis around the light source while simultaneously delivering, at predetermined intervals, amounts and rates, water optionally containing plant nutrients to all of said seeds or seedlings as they rotate; and
(d) regulating said light source during periods of plant growth and non-growth.

It is preferred that the rate of rotation and the intervals, amounts and rates of delivery of water optionally containing plant nutrients are selected for optimum plant growth towards the light source.

In a preferred embodiment, the array includes a plurality of arcuate ribs lying on circumferential lines that pass thru the horizontal axis of the sphere, the ribs carrying spaced seeds or seedlings in growth media, and water optionally containing plant nutrients is delivered to the interior of the ribs for contact with the growth media carried by each rib as they rotate.

In another embodiment, the array includes seeds or seedlings in growth media carried on a plurality of spaced porous needles lying along circumferential lines that pass thru the horizontal axis of the spherical array and point at the center of the spherical array, and water optionally containing plant nutrients is delivered via said porous needles to the growth media as they rotate.

The invention also provides apparatus for growing plants which includes:
(a) a spherical array of seeds or seedlings that radially face the center of the spherical array, preferably along circumferential lines that pass thru the horizontal axis of the array;
(b) a growth promoting light source generally at the center of the spherical array which is operable during periods of plant growth and non-growth;
(c) means to rotate the spherical array on its horizontal axis around the light source; and
(d) means to simultaneously deliver, at predetermined intervals, amounts and rates, water optionally containing plant nutrients to the seeds or seedlings to maintain approximately equal weight distribution among rotating plants growing towards the light source.

Additional means are preferred to regulate the rate of rotation and the intervals, amounts and rates of delivery of water optionally containing plant nutrients for optimum plant growth towards the light source.

In a preferred embodiment, the array includes a plurality of arcuate ribs lying on circumferential lines that pass thru the horizontal axis of the sphere, the ribs carrying spaced seeds or seedlings in growth media, and means to deliver water optionally containing plant nutrients to the interior of the ribs for contact with the growth media carried by each rib as they rotate.

In another embodiment, the array includes seeds or seedlings in growth media carried on a plurality of spaced porous needles lying along circumferential lines that pass thru the horizontal axis of the sphere and point at the center thereof, and means to deliver water optionally containing plant nutrients via the porous needles to the growth media as they rotate.

BRIEF DESCRIPTION OF THE DRAWINGS

The following drawings show preferred embodiments and are not intended to restrict or otherwise limit the invention in any way. All known functional equivalents of components or elements disclosed or shown herein are within the intent and scope of the invention.

FIG. 2 is side view of the carousel of FIG. 1 from the water feed side showing the spheres in the drive position;

FIG. 3 is the same as FIG. 2 but from the power feed side and showing the spheres rotated to a loading/unloading position;

FIG. 5 is a cross-sectional view of a growth sphere of the invention showing young plants in growth media on needles for delivering growth promoting substances to the plant;

FIG. 6 is a view top of a growth medium cover shown in FIG. 5;

FIG. 7 is a side view, partly in phantom, of a delivery needle shown in FIG. 5;

FIG. 12 is a perspective view of a sphere quarter with fully grown plants ready for cropping;

FIG. 13 is an overall perspective view of a plant utilizing spheres of the invention for carrying out the inventive method;

FIGS. 17A-C are views, partly broken away in the case of FIGS. 17B and C, showing features of the arcuate ribs used in FIG. 15;

DESCRIPTION OF PREFERRED EMBODIMENTS

Figure 14:
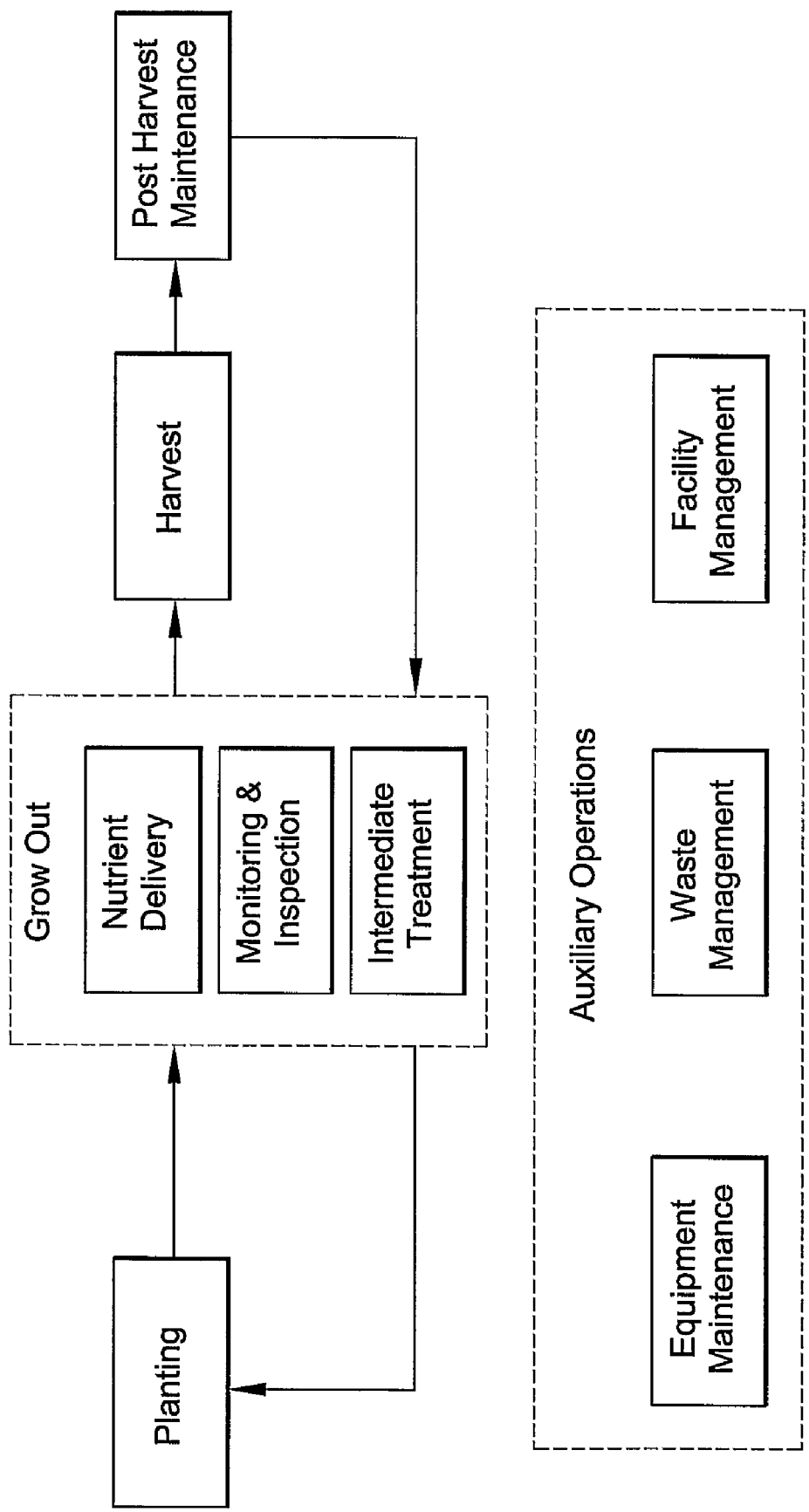
FIG. 14 is a flow diagram illustrating process flow of the plant shown in FIG. 13.

FIGS. 1-12 illustrate one embodiment using closed spheres while FIGS. 15-19 illustrate another embodiment using open framework spheres. Both embodiments share common elements and the basic features shown in FIGS. 1-12 can be readily adapted to accommodate the open framework spheres illustrated in FIGS. 15-19. FIGS. 13 and 14 are generic to both embodiments.

Figure 1:
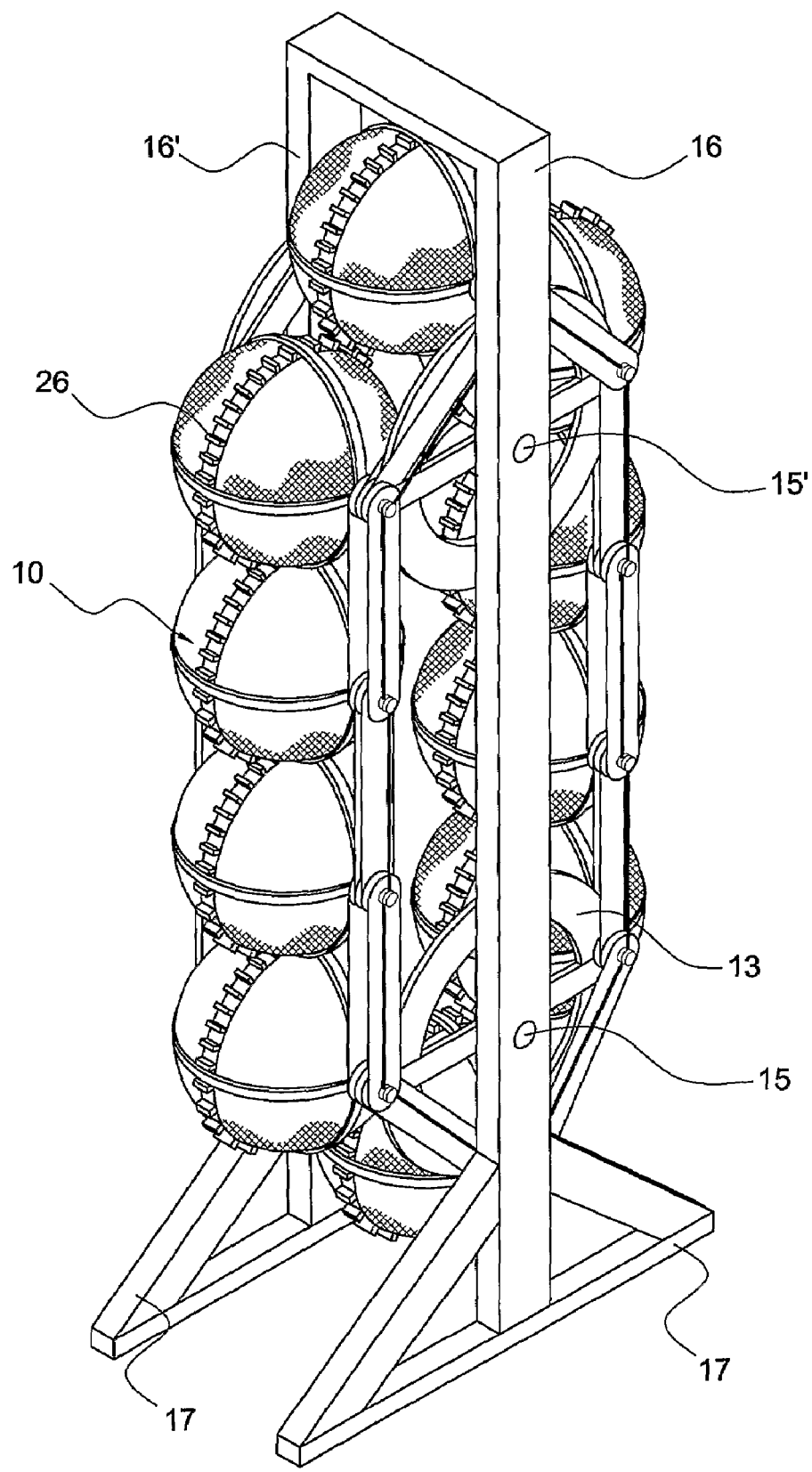
FIG. 1 is a perspective view showing a carousel arrangement of rotatable spheres.
Figure 2B:
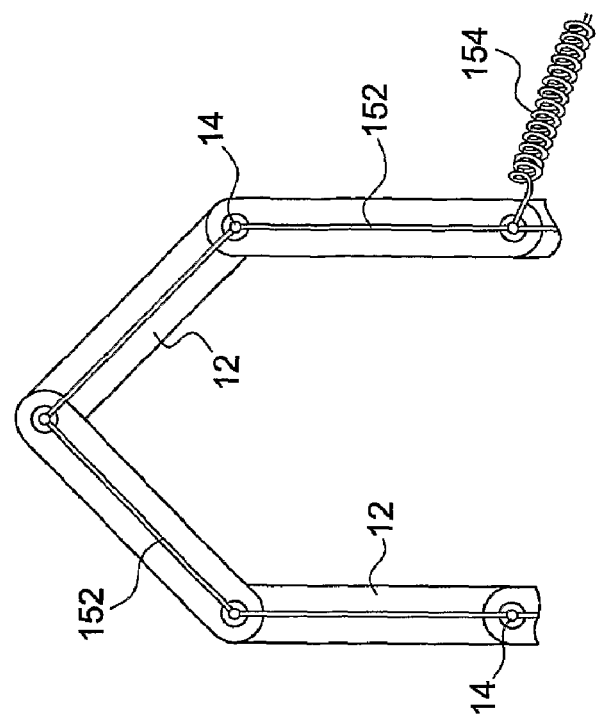
FIG. 2B is a side view partly broken away showing the power input and distribution to a set of five electrical bearing assemblies.
Figure 2A:
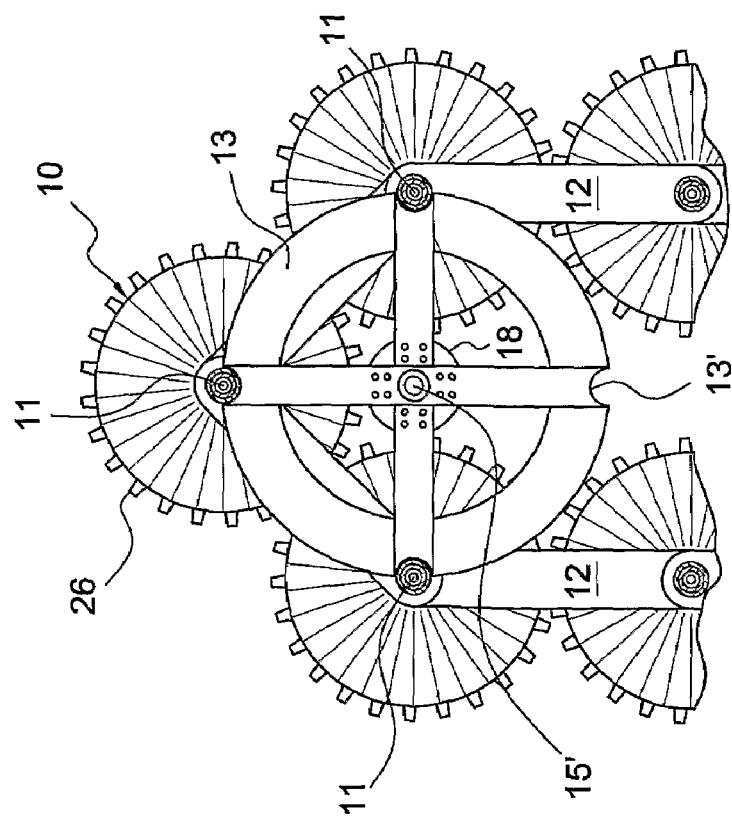
FIG. 2A is a partly broken away view along line A-A of FIG. 2 showing a drive wheel and linkages.
Figure 9:
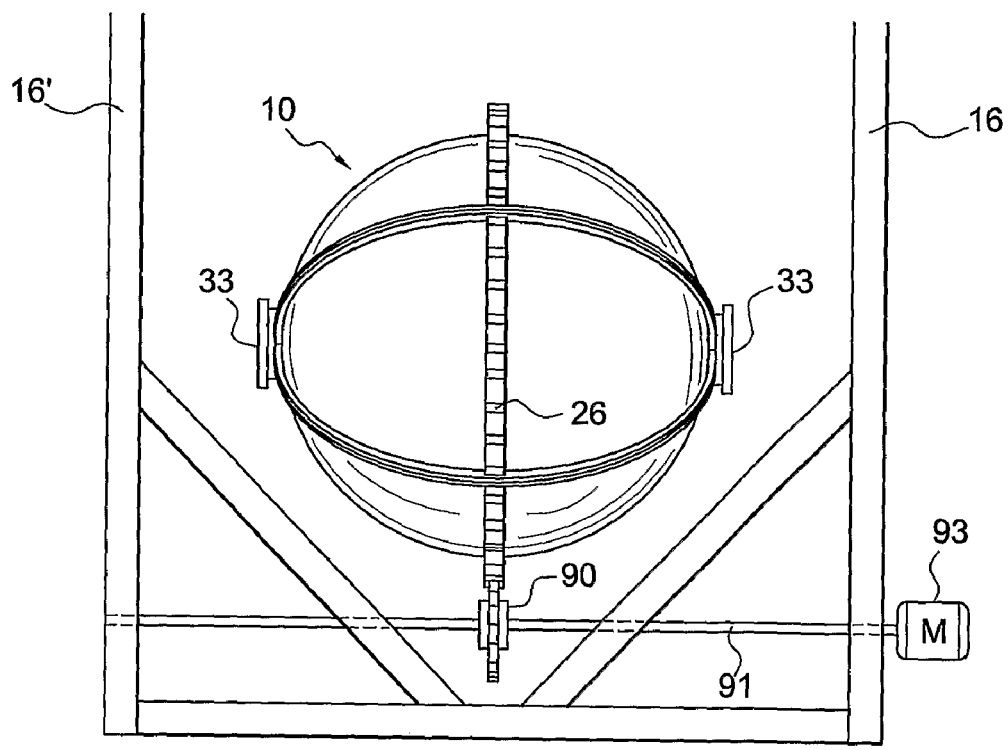
FIGS. 9 and 10 are detail side and end views of a driving mechanism for rotating the interlocked spheres shown in FIG. 1.
Figure 10:
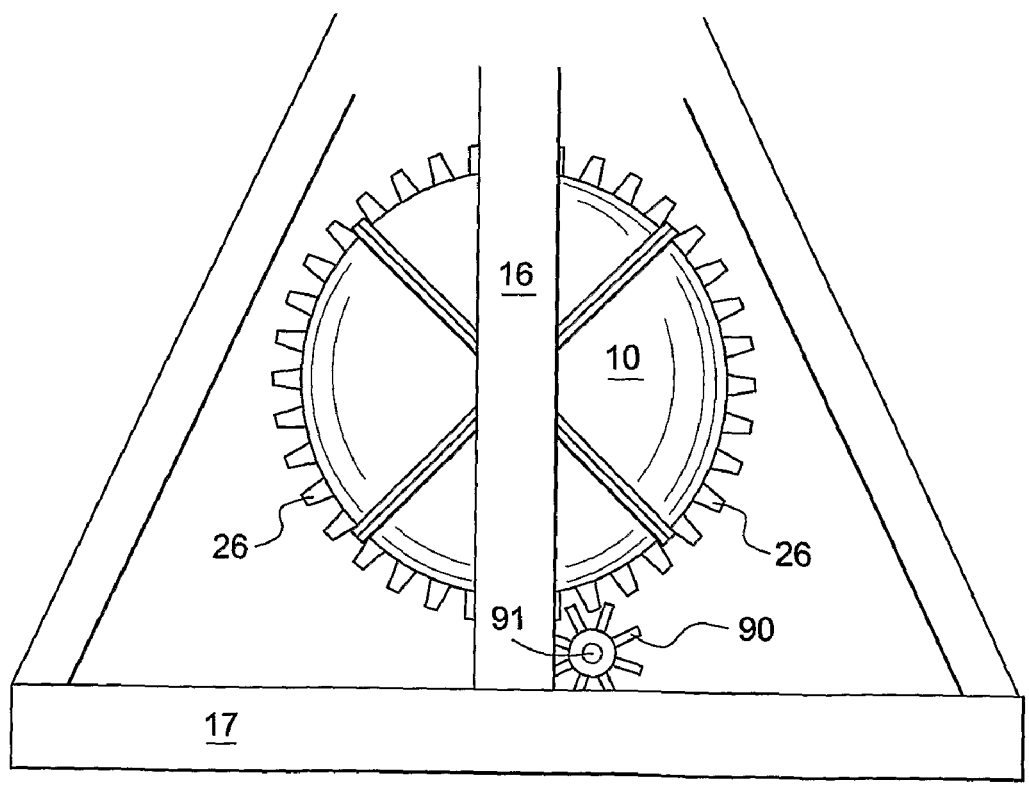
Figure 11:
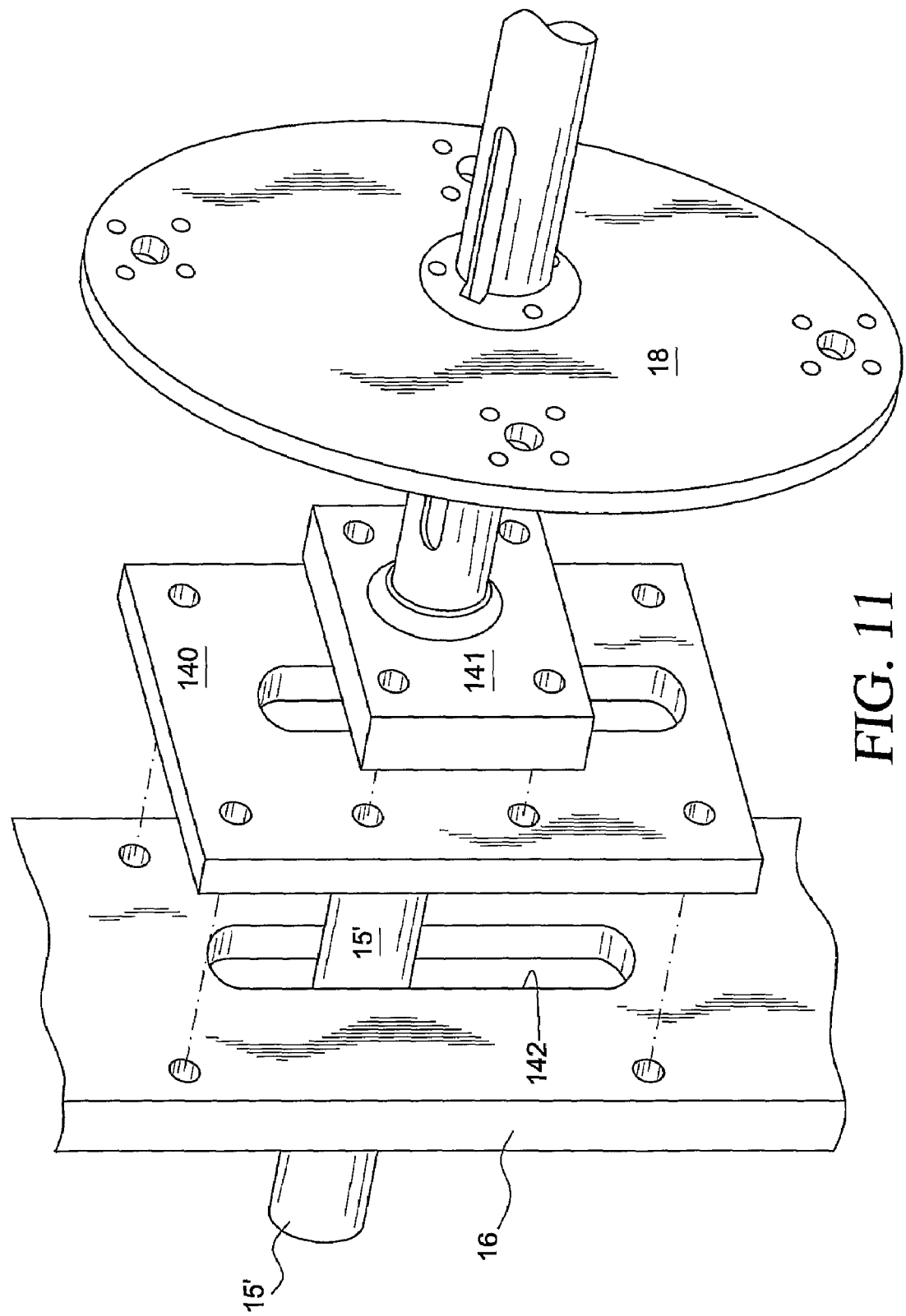
FIG. 11 is an exploded, perspective view of the drive shaft and sprocket hub assembly shown in FIGS. 2 and 3 for moving the spheres between driving and loading/unloading positions.

Referring now to the drawings, FIGS. 1, 2, 2A and 3 show a carousel containing ten spheres 10 mounted for tandem rotation by means of lower and upper shafts 15 and 15' carried by frame members 16 and 16' and base members 17, sprocket wheels 13 and links 12 interconnecting and supporting spheres 10 via water input bearing assemblies 11 on the water input side of a carousel (FIG. 2) and electrical input bearing assemblies 14 on the power input side of a carousel (FIG. 3). Sprocket wheels 13 are mounted on drive shafts 15 and 15' via sprocket hub 18 and notches 13' of wheel 13 engage bearings 11 and 14 (FIG. 2A). As shown from the FIG. 2 side, shaft 15' is adjustably mounted to frame members 16 and 16' for rotation via take up base 140, bearing 141 and slot 142 (FIG. 11). Shafts 15 and 15' can be rotated by clutch motors (not shown) to rotate all the spheres at once from a drive position to an unloading/loading position where drive wheel 90 disengages the lowermost sphere (FIGS. 3 and 9-10). In both positions, teeth 26 on each sphere continue to intermesh and rotate together; in the unloading position, with drive wheel 90 disengaged, the spheres can easily be rotated together manually.

In the drive position (FIG. 2), teeth 26 located around the circumference of each sphere 10 intermesh and rotate the spheres individually via gear wheel 90 (FIGS. 9 and 10) which engages teeth 26 of the lowermost sphere 10. Drive wheel 90 is carried by shaft 91 (FIG. 9) which is supported for rotation by sealed bearings on frame members 16 and 16' (not shown). Variable speed motor 93 turns shaft 91 and drive wheel 90 at the desired speed and can be provided with a stop and start clutch or the shaft 91 can be displaced laterally to disengage teeth 26 and gear wheel 90.

Figure 4A:
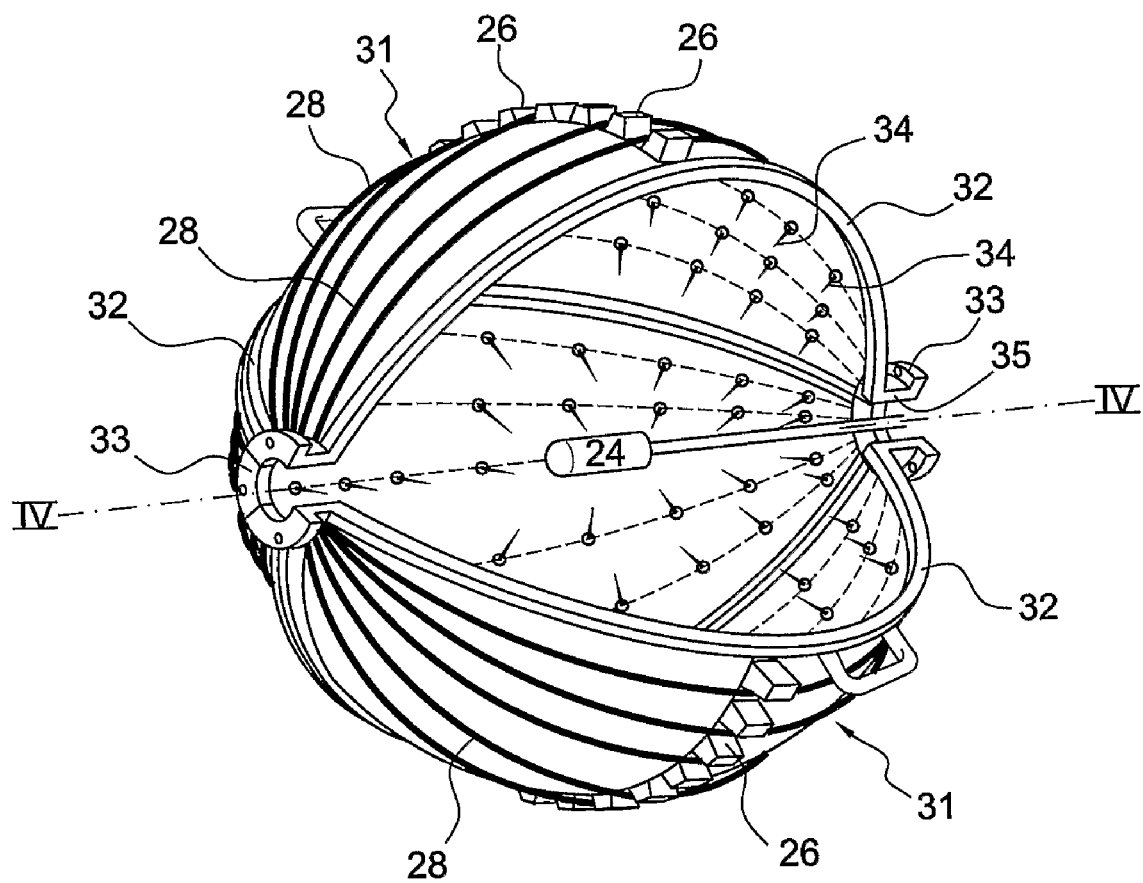
FIG. 4A is a perspective and partly broken away view of a sphere shown in FIG. 1.

As shown in FIGS. 4A-D, sphere segments or quarters 31 have arcuate end portions 35, end mounting flanges 33 and raised arcuate ribs 32 all of which mate when assembled to form circular apertures and flanges at each end of a sphere 10 and two-ply abutting ribs 32 which are clamped together. Longitudinal or rib-like tubes 28 are connected to manifold 41 (FIGS. 4B and D) and are positioned to lie along the exterior of each sphere quarter 31 in equally divided segments to deliver water and plant nutrients simultaneously to needles 34 (FIG. 4A). In place of the handles shown in FIG. 4A, cutout hand holes can be used to load and unload sphere quarters 31. Holes in the sphere wall in general help air circulation and dissipate heat build up.

Water bearing assembly 11 and electrical bearing assembly 14 (FIGS. 2 and 3) are shown in detail in FIG. 4-D. Hollow shaft 73 and mounting flange 75 rotate with each sphere. On the water feed side (FIG. 4B) bolts 75' secure, sphere flanges 33 to water manifold 40 and mounting flange 75. Five membered water feed manifolds 41 (FIGS. 4B and D), one for each sphere quarter 31, communicate with chamber 62 formed by flange 75 and manifold ring 40 and distributes water from hose 46, fitting 87 and tube 85 to individual tubes 28 which feed needles 34. In FIGS. 17A-C, water is fed to a four fingered manifold 41 which distributes it via tubes 28 and connections 216 to the interiors of arcuate ribs 210 describer in greater detail below.

Outer linkages 12 (FIGS. 4B and C) on shaft 73 are connected to outer ball bearings 64 and inner linkages 12 are connected to tapered guide plates 68 (which guide notches 13' of sprocket wheel 13, FIG. 2A) and enclose inner ball bearings 68'. Central ball bearing 61 engages notches 13' for rotating the spheres in tandem. Cover plates 65 are connected though outer linkage 12 to outer bearing 64.

Figure 4B:
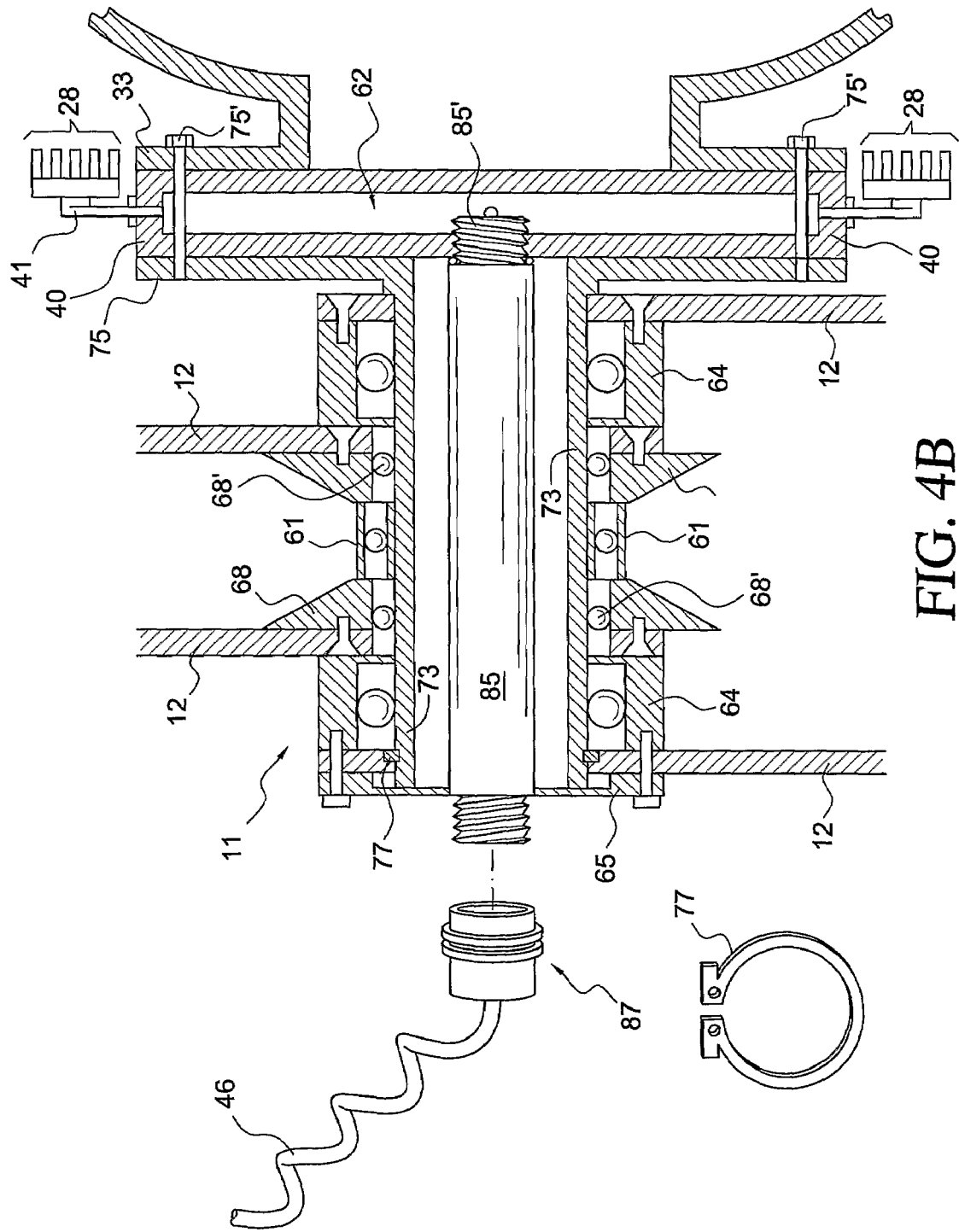
FIG. 4B is a cross-sectional view of the bearing assembly on the water input side of a sphere.

In FIG. 4B, threaded tube 85 connects to rotating water fitting 87 which is fed via flexible hose 46. Tube 85 delivers water to chamber 62 and rotates with flange 75, and the outlet side of fitting 87; the input side of fitting 87, connected to hose 46, swivels in place.

Figure 4C:
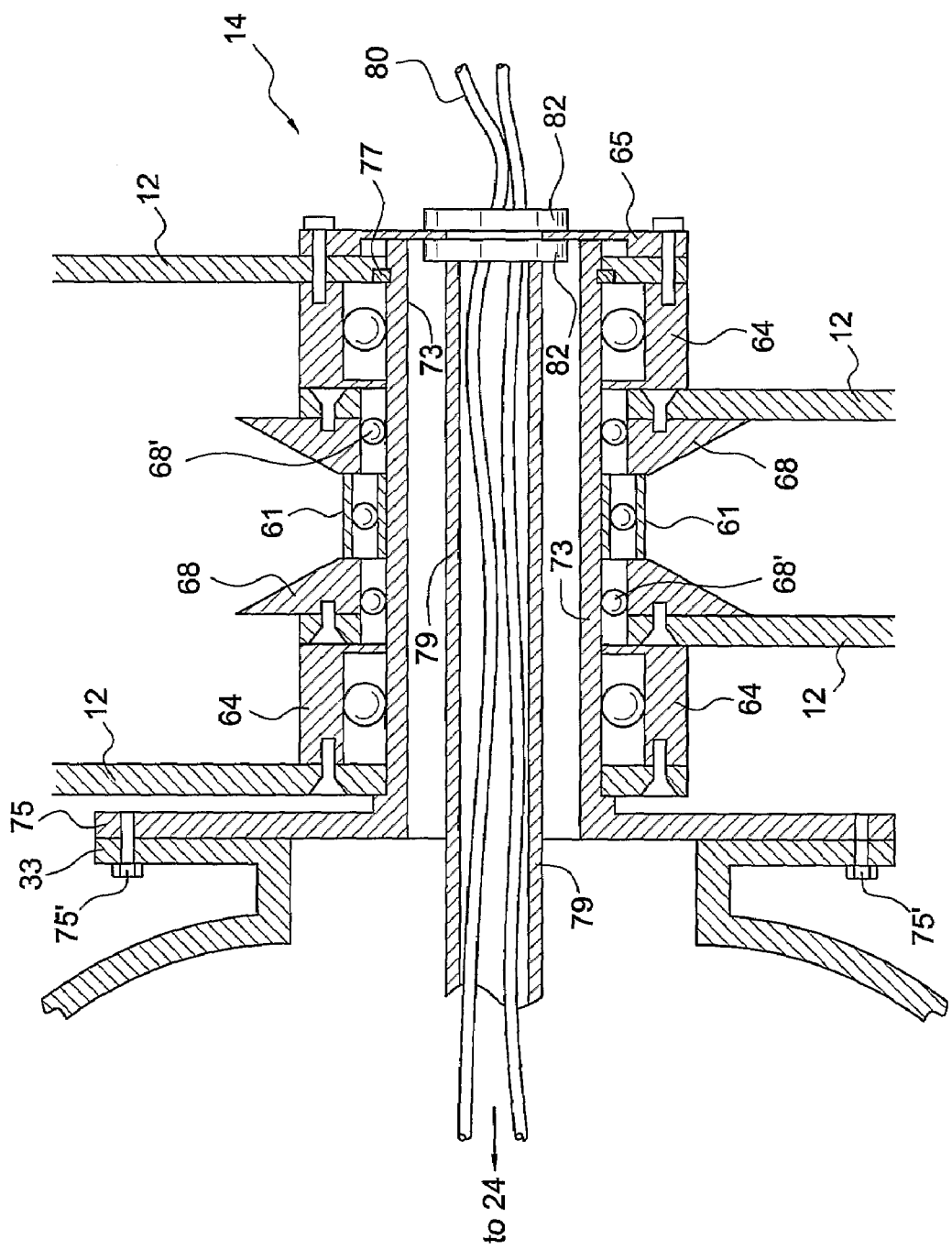
FIG. 4C is a cross-sectional view of the bearing assembly on the power side of a sphere.
Figure 4D:
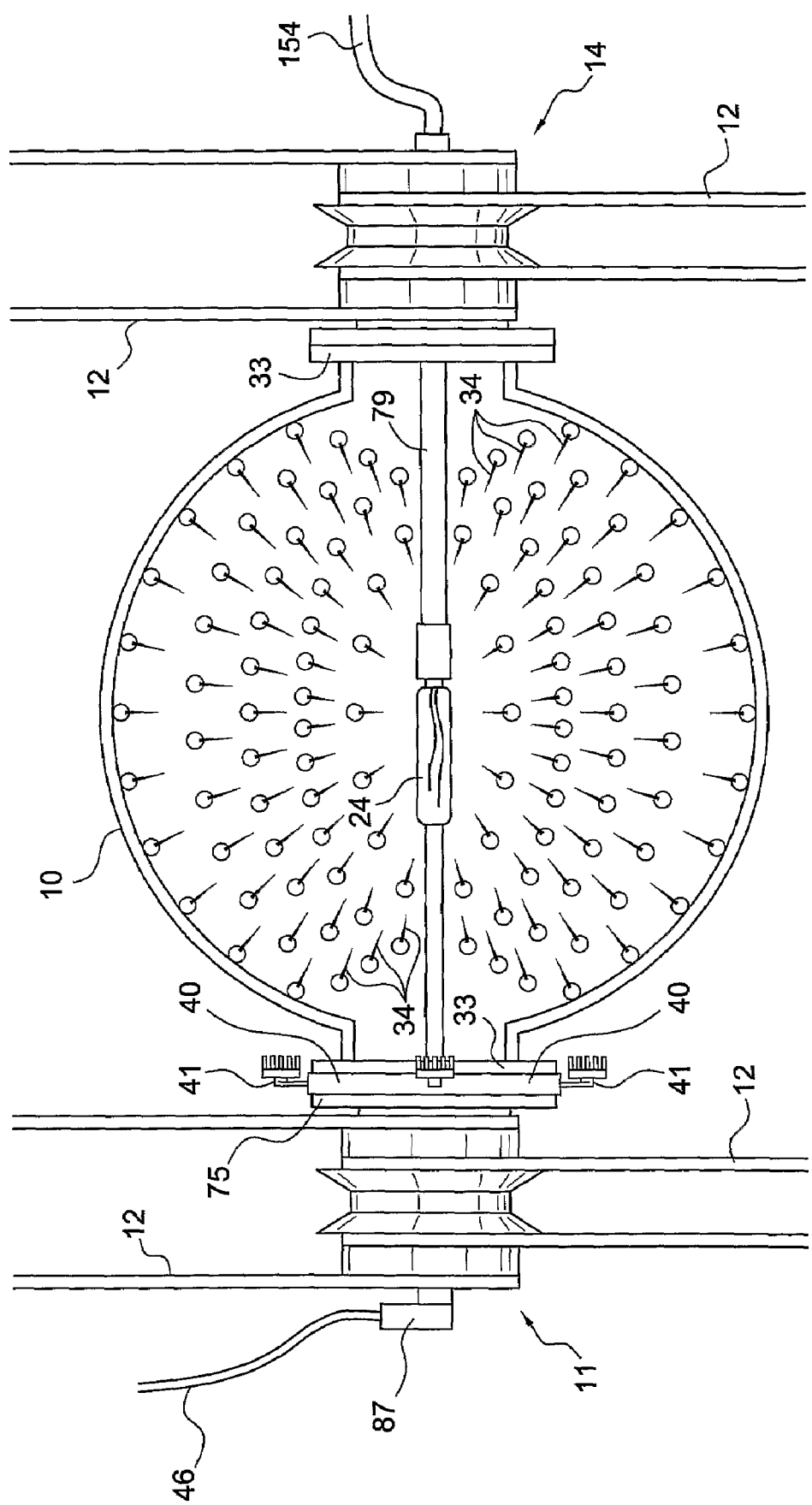
FIG. 4D is a front view, partly in cross-section, of the bearing assemblies of FIGS. 4B and 4C on either side of a sphere with interior needles lying on radial lines from the sphere center.

In FIG. 4C, on the electrical input side, conduit 79 contains wires 80 to power light source 24 and is carried by end plate 65 via opposing lock nuts 82. Snap ring 77 holds the bearings in place in both assemblies. Flanges 33 are bolted via bolts 75' to flange 75.

FIG. 2B shows diagrammatically how a group of five spheres 10 in a carousel can be supplied with power. Flexible power cord 154 is attached to one electrical bearing assembly 14 and the other four bearing assemblies 14 receive power in series via power lines 152. A similar arrangement is used to supply power to the bearing assemblies 14 of the other five spheres in a carousel. The same type of arrangement is used on the opposite side of a carousel to supply water to the spheres 10. A flexible water hose 46 is attached to rotating water fitting 87 (FIG. 4B) of one water bearing assembly 11 (FIG. 2) and four other bearing assemblies 11 receive water in series by interconnecting hoses lines or hoses 152 in a substantially similar manner as shown in FIG. 2B. The other five spheres in series receive water in the same fashion.

Needles 34 project from the inner wall of each quarter 31 in a spaced array such that each needle 34 points at the center of the sphere which contains a light source shown generally be reference numeral 24 (FIG. 4).

As shown in more detail in FIG. 7, each needle 34 has an exterior threaded portion at its base which extends thru an opening in the wall of quarter 31 and is held in place by a pair of opposing nuts 72. Each needle has an interiorly threaded bore 70 into which is screwed a barbed water fitting 74, 76 which connects with tube 28 on the exterior of quarter 31. Water from tube 28 flows thru fitting 74, 76, interior bore 70 and out via apertures 38 of needle 34.

As illustrated in simplified cross-sectional detail in FIGS. 5 and 6, four sphere quarters 31 come together at dual ribs 32, which are clamped together, with U-springs 57 for example, to form a sphere 10. Each needle 34 is mounted to the interior wall 56 of each quarter 31 as shown in FIG. 7. In the embodiment shown, rock wool cubes 52 with a cutout portion holding peat puck 50 are pressed down over each needle 34 and held in place via cap members 55 and pressure fit rubber washers 59. Slot 60 in cap 55 (FIG. 6) allows plant 54 to grow towards light source 24 at the center a sphere 10 with its roots extending into puck 50 and rock wool 52.

It is also possible to employ longer needles with misting heads at intervals among the plants in a sphere. Such needles would be connected to the water distribution system to mist the interior of the sphere at selected intervals and durations. Misting can be desirable when growing plants that require high humidity conditions.

Figure 8:
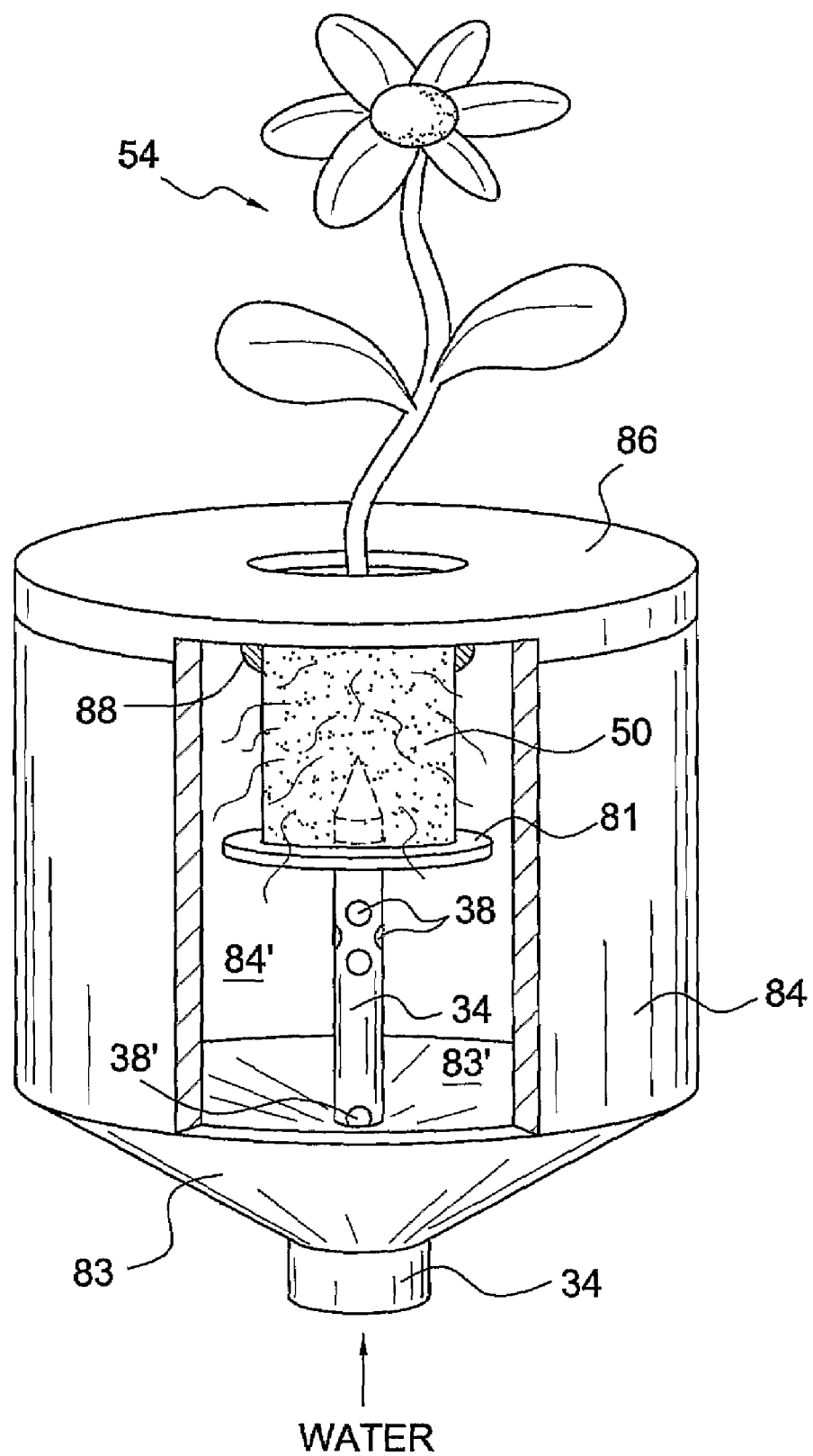
FIG. 8 is a perspective view, partly broken away, of an alternate embodiment of a growth vessel and delivery needle according to the invention.

FIG. 8 shows an alternate embodiment for the growing medium shown in FIG. 5. Hollow circular vessel 84 has a conical base 83 forming a sloping inner floor 83' which receives needle 34 centrally as show. Disc like member 81 is mounted to the upper end of needle 34 and supports peat puck 50 against cover 86, preferably within ring 88 on the underside of cap 86. Plant 54 grows in puck 50 thru a central opening in cap 86 and its roots enter the free space in vessel 84 as shown. Water and nutrients are fed thru needle 34 and enter free space 84' thru apertures 38 simultaneously in all vessels 84 in a given rotating sphere 10. Once the roots and puck 50 are saturated, the water feed system can be reversed to remove excess water that is funneled towards aperture 38' at the base of needle 34 and at the same time draw air and/or oxygen into puck 50 in enhance plant growth. Rotation of the spheres 10 causes excess water to collect at the bottom 83' of vessel 84 for removal thru aperture 38'.

The embodiment of FIG. 8 is not limited to use in a rotating sphere as described herein. It can be used in an otherwise conventional hydroponics system with the advantage of avoiding and preventing over watering and root rot. Banks of vessels 84 can be connected to a common water feed system whereby water and nutrients flood the interior of vessel 84 via needle 43 at selected intervals, contacting exposed plant roots and saturating peat puck 50. Over watering is avoided by reversing the water feed system when saturation is reached, thereby drawing out excess water from the base of vessel 84 thru aperture 38' and drawing air in thru puck 50 to enhance plant growth.

Vessel 84 can also be filled with mineral soil and/or peat to provide a grown medium with similar qualities as soil in a field. Soil and/or peat can be certified organic for growing organic crops. Vessel 84 can be made of thermoplastic for reuse with new or refreshed medium 50. The walls of vessel 84 can be porous so as to allow air to pass through but not water.

Growth medium 52 (FIG. 5) and growth vessels 84 (FIG. 8) can be three to four inches in diameter or square and three to four inches high. Seeds, which can be in porous rubber or plastic seed carriers, are pushed down into the growth medium 50. Pre-grown seedlings can be planted in the growth medium in a similar fashion. As the seeds germinate, roots extend into the medium 50 and receive water and nutrients via apertures 38 in needles 34.

Figure 18:
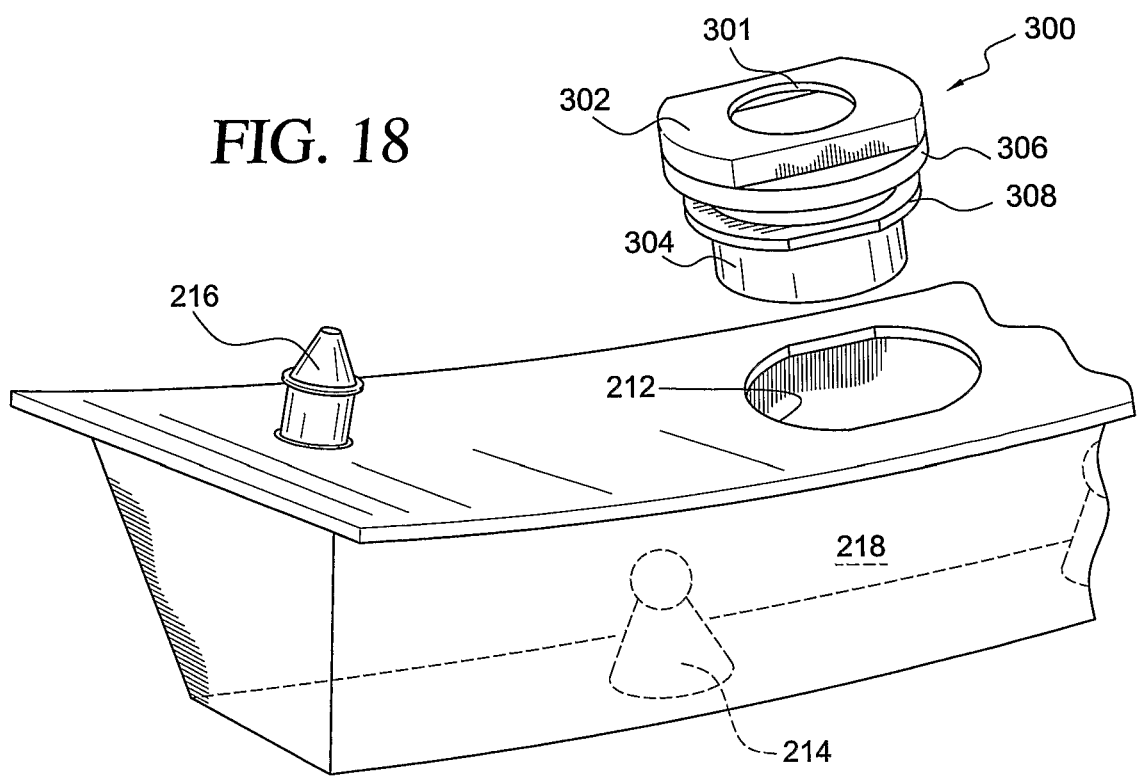
FIG. 18 is an exploded partial view of a rib and a plant holder.
Figure 19:
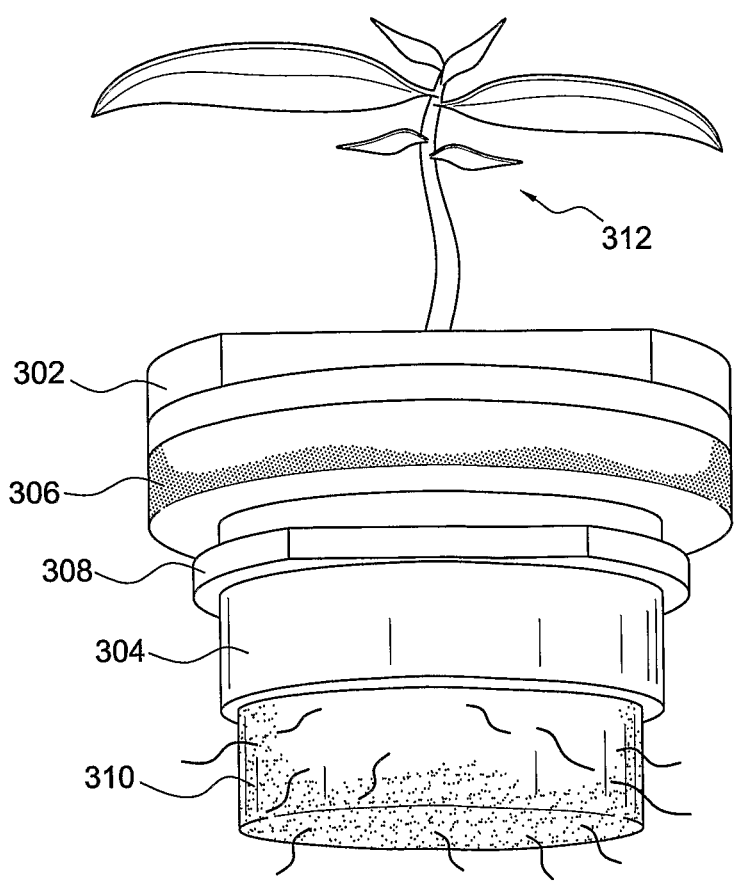
FIG. 19 is a perspective view of a plant in a plant holder for use with the ribs of FIG. 17.
Figure 20:
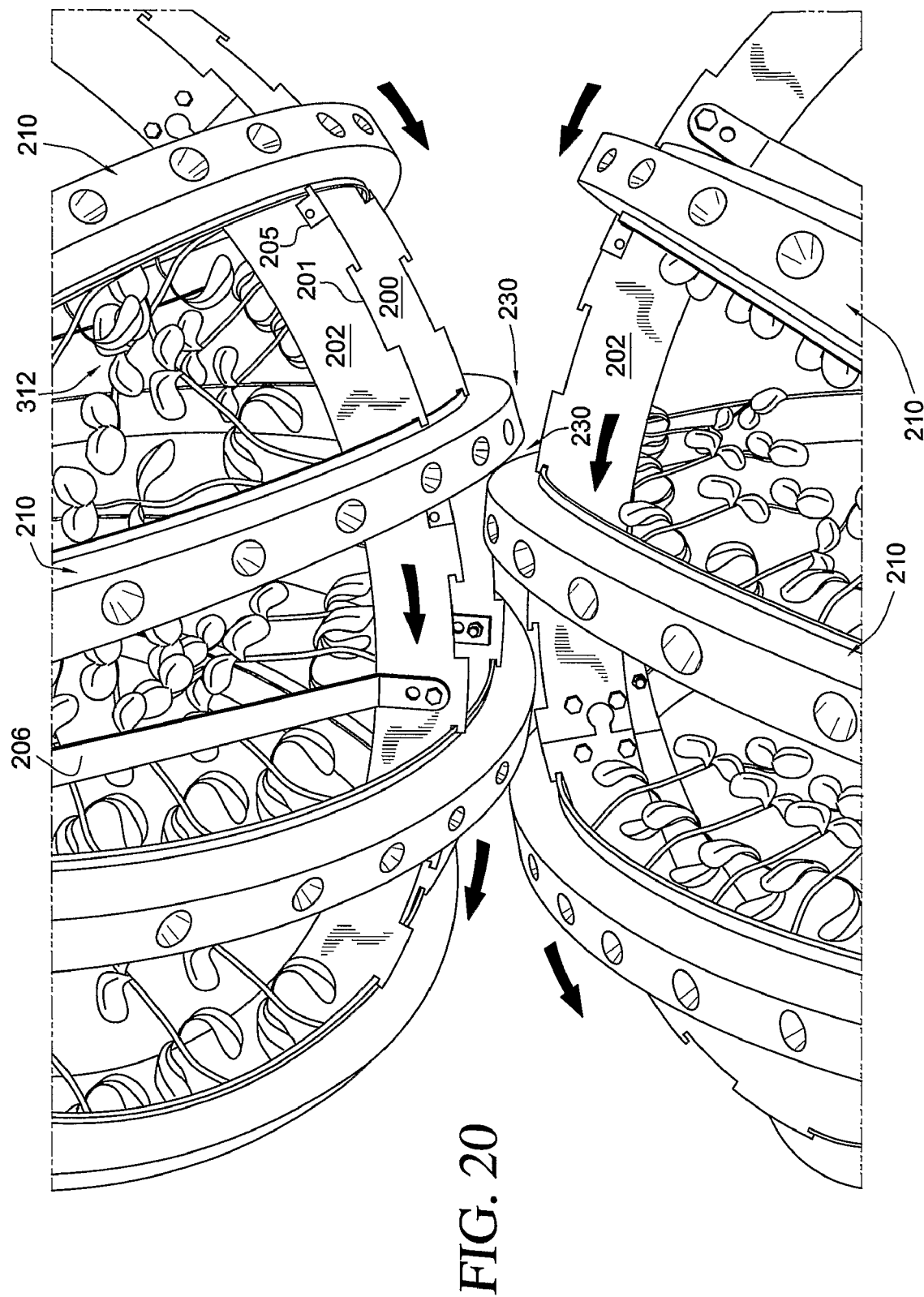
FIG. 20 is a perspective view showing portions of two open framework spheres intermeshing via their respective ribs while rotating.
Figure 21:
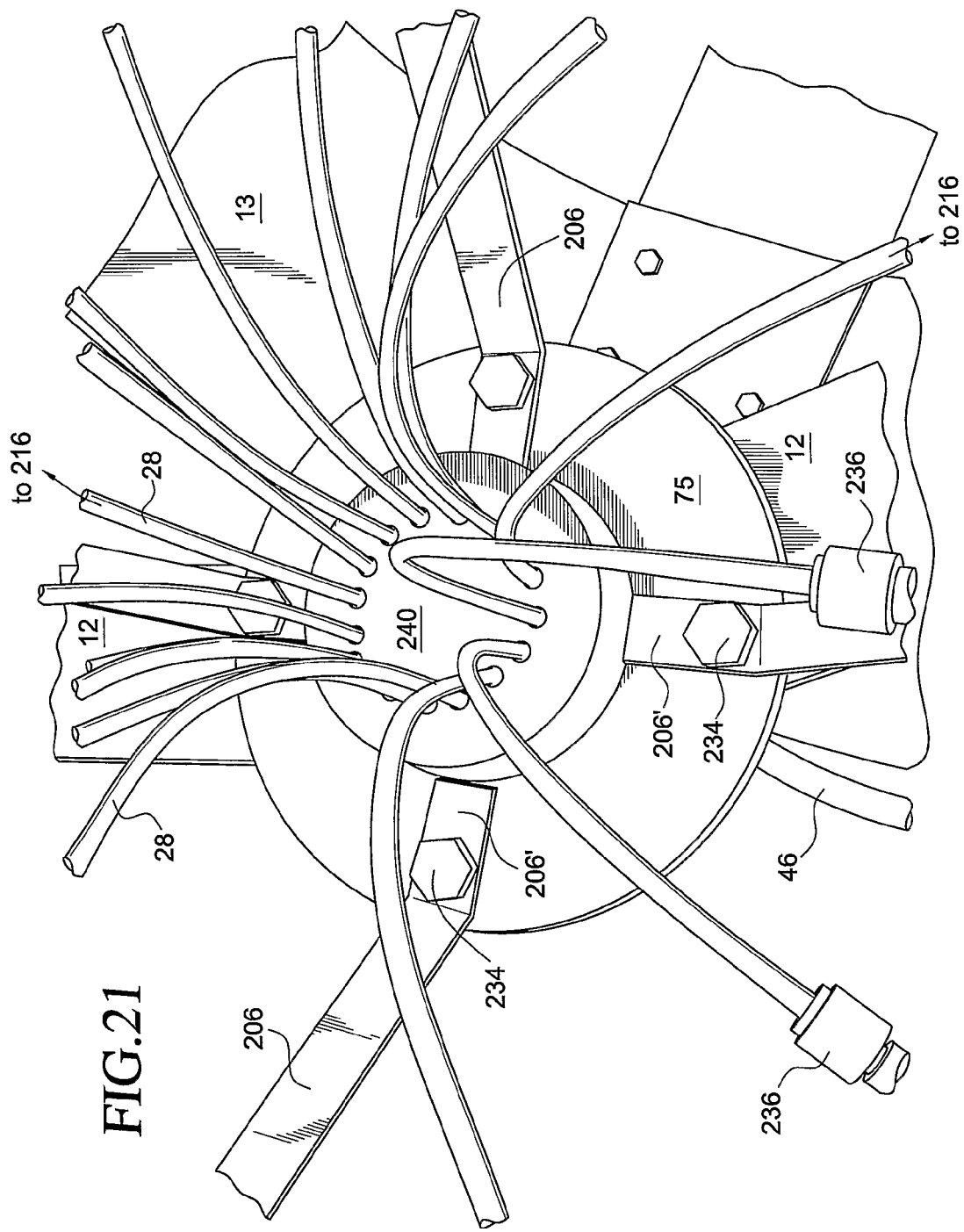
FIG. 21 is a side interior view showing a rotating water manifold for delivering water to arcuate ribs in an open framework sphere.

FIGS. 15-21 show a preferred embodiment using open framework spheres made of a pair of circular bands 200, 202, spacing bars 204 and lateral braces 206 which are attached to a rotating flange 75 FIGS. (4B and 21). Four or eight arcuate ribs 210 are carried in each quarter of the sphere by bands 200 and 202 via mounting slots 201 and 203 which receive lateral edges 220 of ribs 210 (FIG. 17B) and holding members 205. The ribs have hollow interiors 218 and are configured to lie along circumferential lines of the sphere which pass through its horizontal axis as shown. Each rib 210 is provided with a water fitting 216 (such as an Ericson compression fitting well know in the art) which connects with a tube 28 to deliver water and plant nutrients to each rib interior 218 (FIGS. 17, 18 and 21). Conical members 214 extend into the rib interiors 218 from the exterior or concave side of the ribs to assist in water distribution which takes place as the ribs in a sphere rotates about its horizontal axis.

Conical members 214 may also have apertures at their tip (not shown) to aid in gas exchange during plant growth. Air exchange also takes place thru growth media 310. The water level in the interior of ribs 210 preferably should not exceed the height of the conical members 214 to prevent leaking when they are provided with tip apertures. As ribs 210 rotate, water fed to their interiors will tumble and slosh around and generally constantly contact growth media 310 extending into each rib during the entire rotation cycle. Thus, water will collect at the center of the ribs when they are at the six o'clock position and will then tumble and become distributed, with the aid of conical members 214, as the ribs rotate to the twelve o'clock position where the water will collect at the ends of the ribs. Distribution is then reversed as the ribs return to the six o'clock position. This movement of the water in the ribs also acts as a water piston aiding gas exchange thru the growth media and the tip apertures of members 214. It is preferred to charge the ribs with water at intervals and allow the growing plants to consume the water during portions of the growth cycle, for example for about an hour in the case of basil, and then recharging, preferably before the plants go dry.

Sphere rotation is carried out in the same fashion as in FIGS. 1, 2, 9 and 10 except ribs 210 replace teeth 26 and themselves engage drive wheel 90 and intermesh with each other causing all the spheres in a carousel to rotate around their horizontal axis. This is shown in FIG. 20 where adjacent rotating spheres intermesh at 230.

Figure 15:
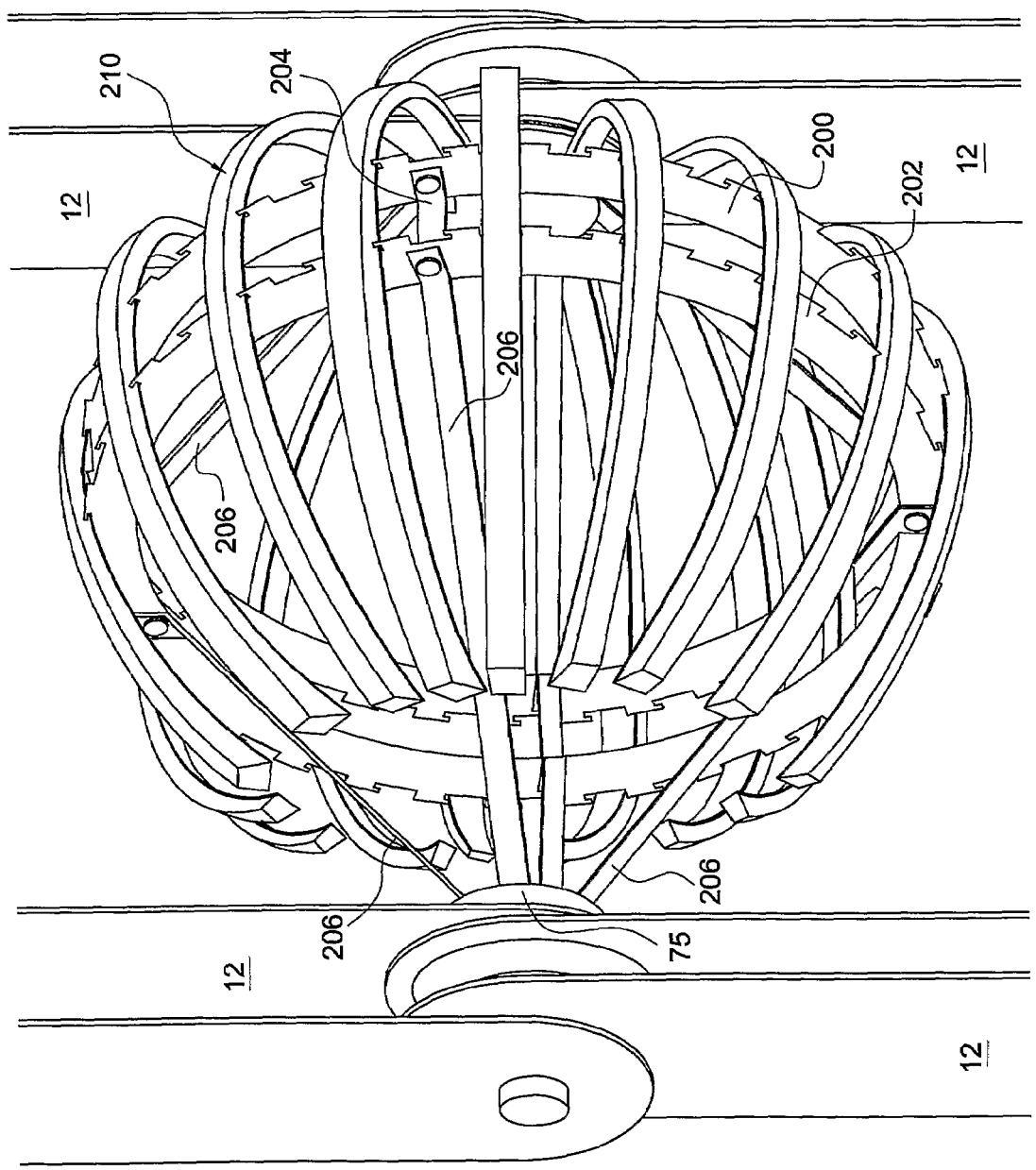
FIG. 15 is a perspective view of a preferred embodiment employing an open framework sphere and arcuate plant-carrying ribs mounted thereon.

Each rib 210 is provided with a series of spaced apertures 212 which radially face the center of the open framework sphere (FIG. 15). Preferably equally spaced, each aperture 212 receives a plant holder such as shown in FIGS. 18 and 19. The holder has an upper section 302 with a central aperture 301 through which a plant 312 grows in grown media 310 radially inward towards the central light source 24. The media 310 is preferable a readily available peat moss puck which can be encased in open mesh fabric or netting.

The grown media 310 is inserted into the bottom section 304 of the holder until it comes flush with the inside of the top section 302. Seeds or seedlings are easily inserted into the media through aperture 301 as shown. Below upper section 302 of the plant holder is a resilient retaining ring or washer 306 and there below a locking ring 308 which will pass thru a correspondingly shaped aperture 212 of rib 210 in one direction and lock in place when turned 90 degrees, as is known.

As shown in FIG. 19, the growth media 310 extends into the rib interior 218 and beyond lower section 304 of the holder. This exposure is preferred and insures good contact with water present in the rib interior 218. The amount of water, or water and plant nutrients, is selected for maximum plant growth. As the sphere rotates, the water will collect at the ends when each rib reaches its highest vertical position. It will then begin to flow and contact the exposed growth media 310 as the sphere rotates through a complete 360 degrees; conical members 214 assist in distributing the water for maximum contact with the growth media 310.

Figure 22:
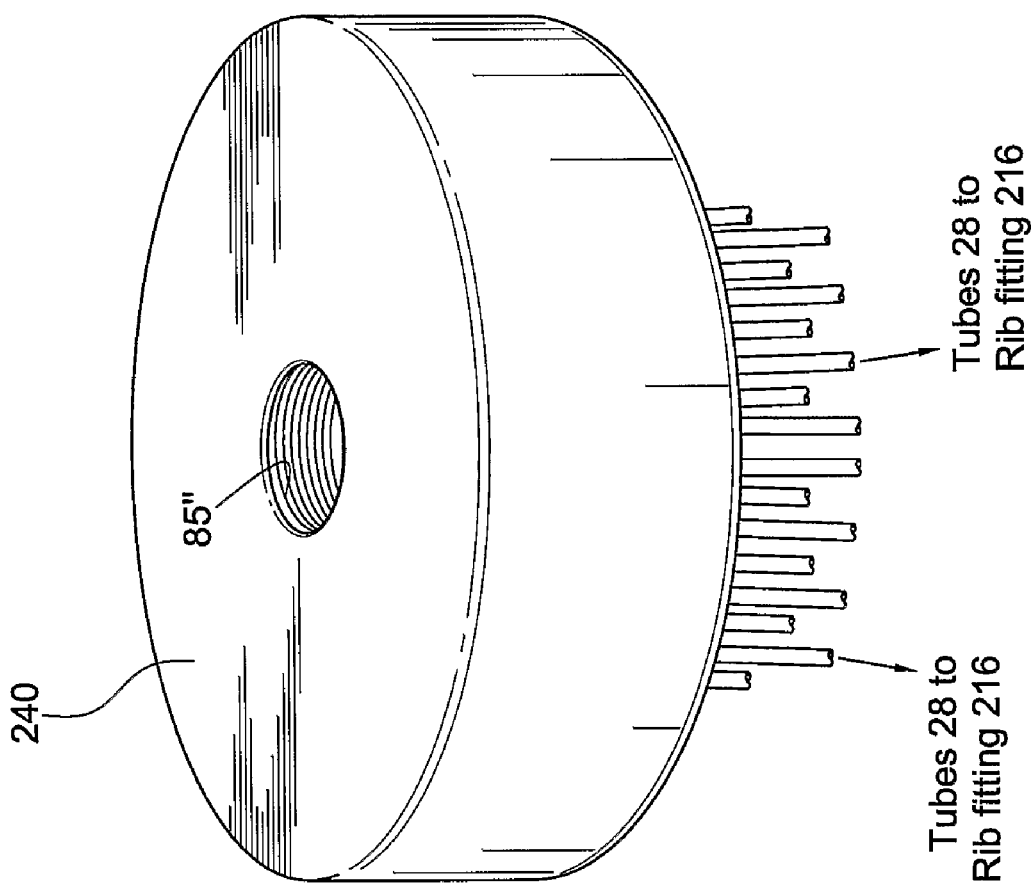
FIG. 22 is a perspective view, from the input side, of the water manifold of FIG. 21.

FIGS. 21 and 22 show water manifold 240 with threaded aperture 85" (FIG. 22) extending through mounting flange 75 (FIG. 4B) on which braces 206 are mounted via bolts 234. Manifold 240 is connected on the input side to tube 85 via threaded end 85' screwed into opening 85".

Water is fed from hose 46 through swivel fitting 87, tube 85 into the interior of manifold 240 and exits through tubes 28 which are connected to individual ribs 210 via fittings 216.

Figure 16:
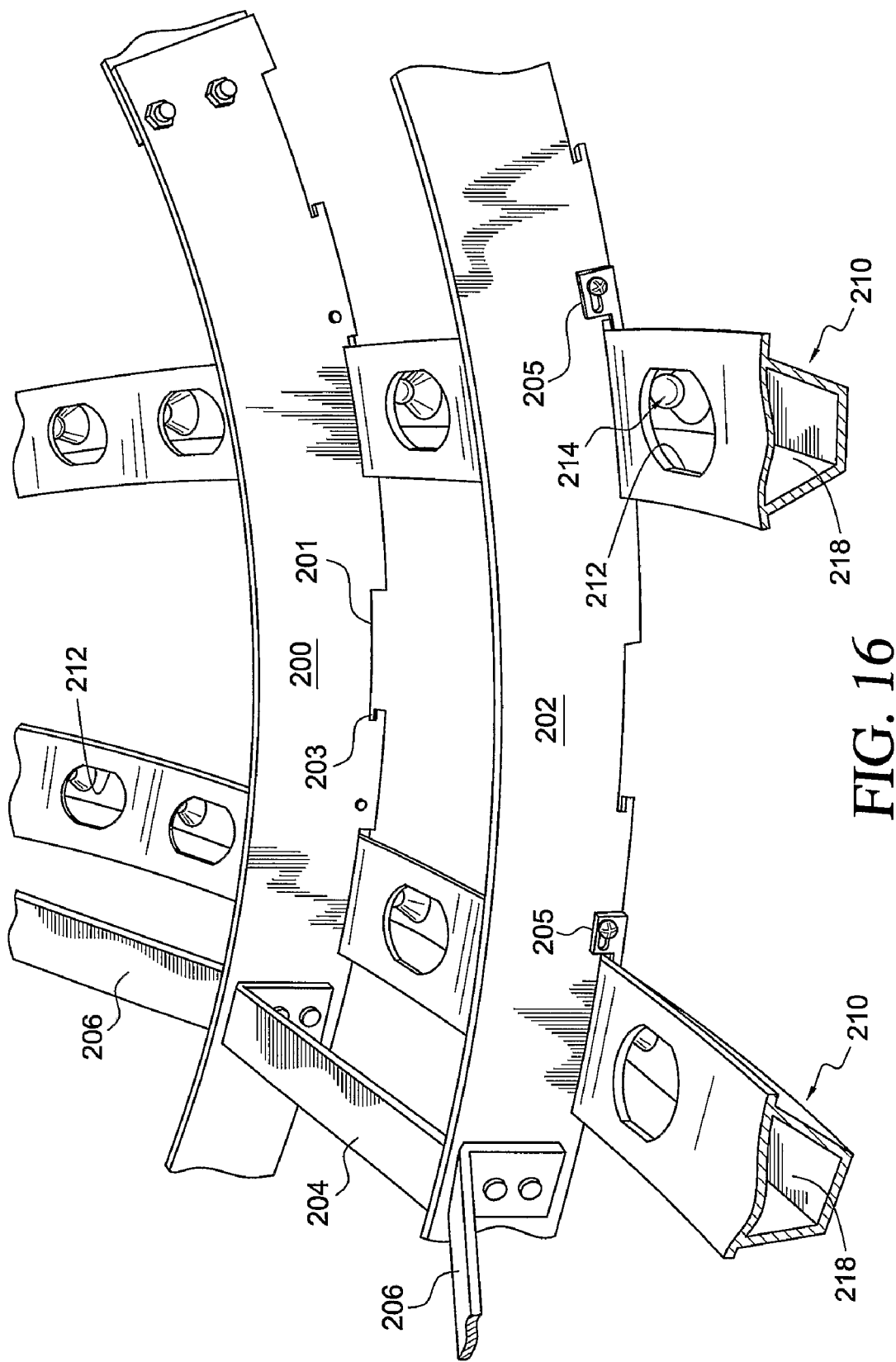
FIG. 16 is a detailed partial view of the sphere shown in FIG. 15.
Figure 24A:
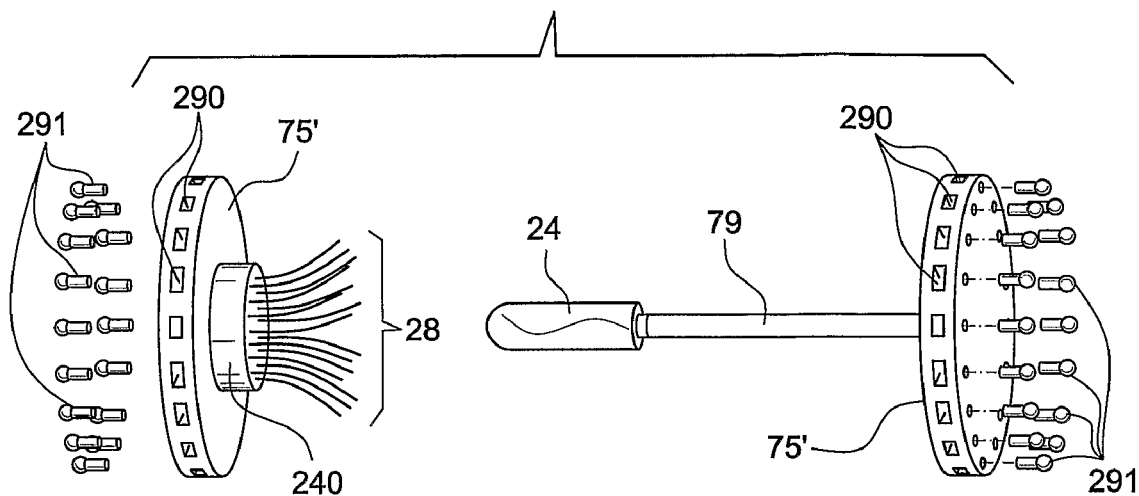
FIGS. 24A and B are exploded views of an alternate embodiment for mounting arcuate ribs in an open framework sphere.
Figure 24B:
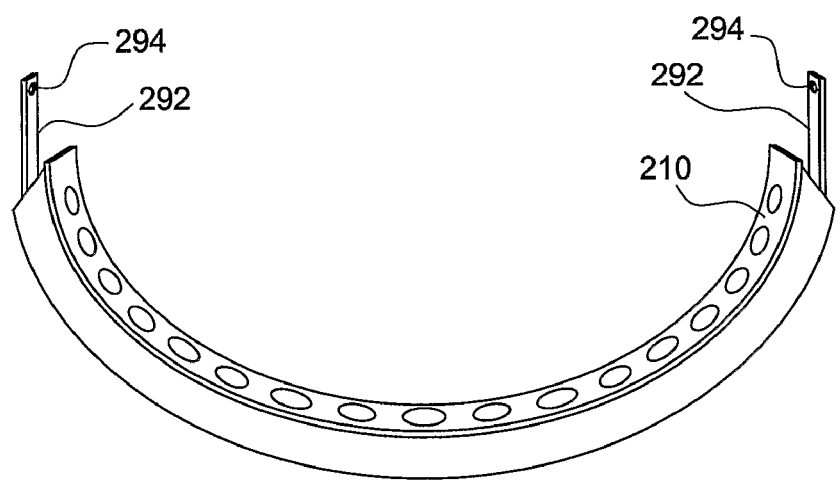

FIGS. 24A and B show an alternate embodiment for mounting ribs 210 into a sphere with or with out bands 200 and 202 and braces 204 and 206 as shown in FIGS. 15 and 16. Each rib 210 has an extension member 292 with an aperture 294 adjacent each end. Members 292 are inserted into corresponding radial slots 290 around the edge of modified mounting plate 75'; quick-release locking pins 291 pass through apertures 294 and slots 290 to secure each rib in place for rotation and plant growth.

It has been found that less energy is required to germinate seeds into seedlings and the preferred practice is to seed a series of side-by-side banks of ribs before mounting on a sphere; the seeds are quickly germinated under artificial light and are mounted to into spheres as describer herein after the seeds sprout.

Figure 23:
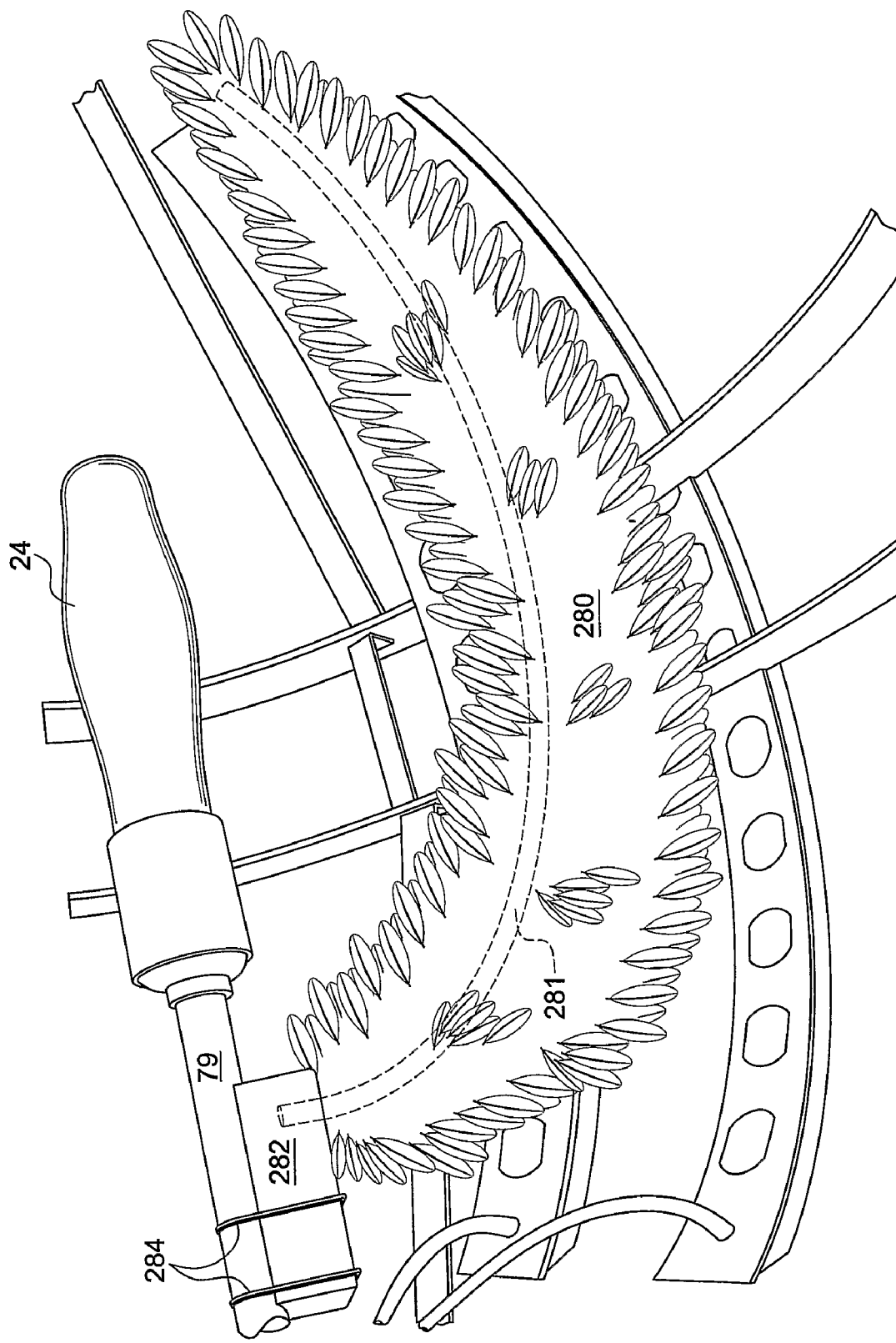
FIG. 23 is a side interior view of a pollination device in the form of an arcuate feather wand mounted to the interior of a sphere.

FIG. 23 shows a pollination device which can be used to advantage to pollinate growing plants like strawberries and the like. The invention allows the growth of plants that require pollination without relying on natural pollination such as from bees. In one aspect, pollination can be promoted within a sphere by mounting a device for gently contacting flowering plants in a rotating sphere so as to dislodge pollen and spread it to other flowers for cross pollination. This produces rapid and increased growth. In the embodiment illustrated, a feather-like duster 280 carried by a flexible core wire 281 is mounted to block 284 which is in turn mounted to support 79 for light source 24. The feather assembly 280 is contoured to the inner curve of a sphere and is positioned so as to lightly brush against the growing plants to dislodge and redistribute pollen within the sphere. Other similar means can be mounted for periodic or constant rotation relative to the growing plants.

In general, plants are known to respond to gravity, light and nutrients. The gravity response predominates which means plants will inherently grow against gravity even if it means growing away from a light source. Thus, plants that are inverted will turn and grow away from the source of gravity regardless of where the light is coming from. According to the invention, the gravity response is neutralized by regulating the rotational speed of the spheres to create micro-gravity which causes the rotating plants to grow towards the central light source. Rotation of the spheres at selected rates, in effect, tricks the plants into growing towards the light source regardless of their position in the sphere and their rotation about its central horizontal axis. Rotational speeds can be determined empirically and will vary between about 1 and about 10 revolution per minute (rpms), preferably between about 1 and about 5 rpms, depending on the crop being grown. Thus, stunted or flat or spreading growth in a plant that normally grows upright can be corrected by increasing the rpms in increments until the plants resumes their normal growth pattern. Strawberries have been found to grow prolifically at an rpm of 0.25 with aided pollination such as illustrated in FIG. 23.

Rotational speed of the spheres, watering with nutrients, gas supply, temperature, air circulation, light source and periods of light and darkness are selected for optimum plant growth as illustrated in the examples.

Simultaneous watering of all the plants in a sphere insures approximately equal or even weight distribution among growing plants. This allows rotational rates as described herein and prevents unbalancing which can have an adverse effect on the operation of a carousel such as shown on FIG. 1. For example, uneven weight distribution can cause uneven bearing wear, drive motor overheating and failure, stressing of linkages, seams and joints and like problems leading to equipment breakdown and failure. Because all the plants in a sphere receive substantially the same light, nutrients and rotational speed, increase in weight due to plant growth is also evenly distributed thus maintaining smooth balanced rotation.

The water distribution system shown in FIG. 4A for example, is operated at a pressure such that water reaches all of the needles in a sphere at substantially the same time to deliver substantially the same amount of water to each plant to maintain even weight distribution and balance throughout the sphere. If more precise release of water to each needle is desired for certain growing conditions, such as when using high rotational speeds, simple pressure relief valves can be installed at the base of each needle. This will ensure that all needles will release water at the same time when a threshold water pressure is reached.

Different crops can be grown in the same sphere but growth rates and crop weight should be considered to maintain even weight distribution and balance. Two diverse crops with different growth rates and/or crop weights can be grown is one sphere without creating an imbalance by having like plants grown in opposite sphere quarters. For example, leaf lettuce can be grown in quarters 1 and 3 while Romaine lettuce is grown in quarters 2 and 4.

Light source 24 delivers growth promoting UV light during selected intervals to the plants growing on the interior of the spheres. The light source 24 is mounted generally at the center of each sphere at the end of conduit 79 (FIG. 4C) and is powered by electrical input wires 80. The light source can also extend along the horizontal axis of a sphere. The light source can be a fluorescent tube or tubes, a light emitting diode (LED), a high pressure sodium lamp, other metal halide lamps or an ordinary light bulb or bulbs in the center of the sphere.

A typical factory for growing plants according to the invention is shown in FIG. 13 wherein carousels generally shown at 108 each containing ten spheres 10 are arranged in five rows. Tanks 103 contain water and plant nutrients which are delivered to the spheres as described herein. Electrical equipment cabinets 104 and control consoles 102 are used to select and regulate rotation speeds for the spheres in a given carousel and feed rates for water and nutrients.

Conveyor belts 106 are used to move sphere segments 31 or ribs 210 from a loading station to a cropping area and back. FIG. 12 shows segment 31 with mature lettuce plants 100 for harvesting. A segment 31, like the one in FIG. 12, is shown in FIG. 13 removed from a sphere and on belt 106 for movement to the rear for cropping the plants which are packaged and held for shipping in a refrigerated storage area. FIG. 14 illustrates the process flow for a typical plant such as shown in FIG. 13.

In other embodiments, the interior of a closed sphere can be under pressure greater than atmospheric. The selected gas can be carbon dioxide or oxygen and fresh batches of water and plant nutrients are preferably delivered to the growth medium without recirculation. Oxygen added to the water stimulates root growth and the injection of carbon dioxide enhances plant growth and will eliminate mites and insects if they infiltrate a sphere, thus eliminating the use of pesticides. In the case of open framework spheres such as shown in FIG. 15, the plant atmosphere, or the atmosphere in a smaller enclosure for the carousels, can be easily controlled using know methods and systems used for clean rooms and the like, for example.

Basil grown from seed and safflower seeds grown from seedlings are examples of plants that can be grown in high yields according to the invention. The invention is especially suited for growing leafy green vegetables, tomatoes, fruits and berries. The following is a representative list of crops that can be grown according to the invention:

Herbs
  *Aloe Vera*
  Artemisia—*Artemisia annua*
  Basil—Ararat basil—Green Globe Basil—Sweet Salad Basil—Thai Basil
  Cilantro—Spice Coriander—Santo Cilantro
  Echinacea—*Echinacea purpurea*
  Eucalyptus—*Eucalyptus globulus*—Peppermint Eucalyptus
  Funnel
  Golden seal
  Lemon balm
  Milk Thistle
  Oregano—Greek Oregano—Italian Oregano—Mexican Oregano
  Paprika—*Capsicum annuum*
  Parsley—Aphrodite parsley—Italian Parsley—Plain parsley
  Peppermint
  Chile Pepper—Habanero—Jalapeno—Tabasco—Scotch Bonnet—Cayenne
  Sage—Extrakta Sage—Garden Sage
  St. Johns Wart
  Yucca—*Yucca glauca*

Vegetables
  Beans—Golden Wax—Tender green
  Broccoli—De Cicco
  Cauliflower—Snowball
  Lettuce—Butterhead—Loose leaf—Oak leaf Red—Romaine
  Spinach—Mustard—New Zealand
  Peppers—Cal wonder—Golden Cal Wonder—Sweet Chocolate—Jamaican Yellow
  Tomato—Roma—Sweetie—
  Pea—Mammoth melting—Oregon Sugar pod—

Berries
  Blueberries—wild and cultured
  Strawberries—all
  Cranberries
  Blackberries
  Raspberries Each sphere is preferably 48 inches in diameter and has of four identical symmetrical sections if closed, or four or eight arcuate ribs in each quarter, if open. The spheres can be built in any size, however. For developmental purposes 48 inches provides for ease of use and ensures that plants are not required to stretch for light source. Sphere quarters and arcuate ribs are preferably made of UV protected ABS plastic.

Light emitting diodes are preferred as the light source because they allow remote control of the spectrum of light within the sphere to accommodate and control specific stages of plant growth and development. LED's draw approximately 25% less power than fluorescent lamps. This makes the use of solar power feasible which is especially beneficial in remote regions.

Heat build up in the spheres, which normally operate at room temperature, can be controlled by regulating the interior temperature of the plant enclosure, by using open framework spheres as described herein, by providing air circulation openings in the wall of the sphere with or without fans to increase circulation, and/or by exhausting interior air through the manifold system for watering.

Preferred injection needles 34 are about 4.5 inches in total length (about 3.5 inches from the interior wall of a sphere) and ⅜ inch in diameter. Needle sizes can be changed dependent upon the needs of the plant to be grown and can be made of injection molded thermoplastic. The number of needles may vary based on the needs of the plants being. Typical planting for a 48 inch sphere utilizes 24 injection needles per quarter 31 (for a total of 96 needles per sphere) in four rows of six needles equally spaced so plants do not need to compete for light.

Water and nutrients are and combined in a tank related to each carousel. The tank will feed each line to each sphere on each carousel simultaneously through the injector needles.

The ability to confine the entire system and the individual spheres allows for minimal or no product loss from rodents or insects. Plants are less likely to contract viruses than on the ground. The controlled environment allows the plants to grow in a sterile environment reducing bacterial and pest infestation without the use of poisons or other insecticides or fungicides. The spheres are self pollinating for fruits and vegetables that require pollination. This is accomplished as shown in FIG. 23 or by simply rotating the spheres; pollen will fall and land on the other plants. No bees are needed.

In one aspect, the invention increases the amount of growing space for a given footprint. For example, in a 12,000 square foot plant as shown in FIG. 13, the actual footprint of the carousels is 6,000 square feet. This equals 50,000 square feet of level growing space.

Water is processed through a reverse osmosis tank to recycle the fertilizer. No soil depletion takes place and no crop rotation is required.

The invention is especially useful is providing a local source of fresh vegetables and fruit with low capital investment. Shipping costs are minimized and use of the spheres is not restricted by region or growing season: any location with a supply of water and power is suitable. Plants can be grown in accelerated growing cycles to meet everyday food needs as well as specialized requirements for specific needs such as by nutraceutical companies. World hunger needs can be addressed locally and high quality seedlings can be grown locally or on site for reforestation purposes. The demand for organically grown products is also met not only for foods but also for nonfood products like cosmetics and like products.

The invention also offers environmental advantages such as reduced fossil fuel use in transporting product to market, energy efficiency, reduced and negligible nutrient pollution, elimination of the use of toxic pesticides and fertilizers, controlled and reduced water usage and the reuse of abandoned or idle facilities.

EXAMPLES

The invention will now be illustrated by several examples which are not intended to limit or restrict the invention in any way.

Fertilizer Makeup

Examples 1-7

Veg A: Aqueous solution of nitrogen 1.5%; soluble pot ash derived from calcium and potassium nitrate, 2.6%.

Veg B: Aqueous solution of nitrogen 0.5%; nitrate nitrogen 0.5%; phosphate 0.5%; soluble pot ash derived from potassium nitrate, phosphoric acid and sulfate of pot ash, 5%.

Examples 1-7, except Example 5, used the same nutrient mixture (sometimes referred to as fertilizer) which was made by combining 30 ml of Veg A and 30 ml of Veg B in 8 liters of fresh water. In Example 5 (Sweet Wormwood), 45 ml Veg A and 30 ml Veg B were added to 8 liters of fresh water to provide extra nitrogen to the plants.

Spheres were rotated at one rpm in all examples

The Squeeze Test for pH and ppm of Nutrients

The squeeze test referred to in the examples is a test to determine the ppm (parts per million) of nutrient salts and the pH levels within a Rockwell cube. The test is performed by gently "squeezing" the cube as to not damage the root mass. As it is squeezed, the liquid within the cube drips out and is collected in a clean container. The collected liquid is tested for pH and ppm levels. If the pH level has risen, the plant is growing because the plant takes up water and nutrients at different rates, changing the ppm level in the cube. When making up the nutrient mixture, nutrient salts are added to the fresh water (ppm=0) the ppm level goes up and the pH level drops. The pH is adjusted to the proper level for the plant being grown. As the plant uses the nutrient the ppm level drops and the pH level rises. By knowing the pH and ppm levels in a cube, the nutrient mixture can be adjusted to provide a balanced root zone environment. Too strong a nutrient mixture will cause burning of the roots. If the nutrient mixture is too weak, it will cause the plant to grow slowly and become deficient in nutrients.

Examples 1-7 were carried out using a carousel of closed spheres as depicted in FIGS. 1-12 and Examples 8-10 were carried out using open framework spheres as shown in FIGS. 15-23 mounted in the same carousel as shown in FIGS. 1-12 using the same supports, drives, linkages and bearings; the closed spheres were replaced by the open framework spheres.

Example 1

*Artemisia Annua*

All water was taken from the reverse osmosis water purification system

All water was treated with 2 ml/L food grade hydrogen peroxide and left to sit 20 minutes before any fertilizer is mixed.

Planting

Day 1—Mix fertilizer with water at a dilution rate of 389 ppm, adjust the solution to a 5.8 pH. Re-hydrate from the bottom using fresh water only; adjust the pH to 5.8. The peat pucks should be moist but not soaking wet. Once the peat pucks are no longer moist to the touch re-hydrate using the same solution as Day 1.

Transplanting into the Sphere

Day 5 Inserted pear puck into 3" Rock wool cubes and secured to the needles using the locking rings. Use a fertilizer mix of 100 ppm at 5.8 pH.

In the Sphere

Day 6-7 pH maintained at 5.8 and 100 ppm fertilizer. Water at a rate of 1 gallon per day.

Day 8-12 pH maintained at 5.8 and 200 ppm fertilizer.

Day 13-15 pH maintained at 5.8 and 400 ppm fertilizer. Water at a rate of 1.5 gallons per day.

Day 16-22 pH maintained at 5.8 and 600 ppm fertilizer.

Day 23-26 pH maintained at 5.8 and 800 ppm fertilizer. Water at a rate of 2 gallons per day.

Day 27-30 pH maintained at 5.8 and 1000 ppm fertilizer.

Day 31-34 Fresh water only to flush the salts from the plants.

Day 35—Harvest the plants.

Example 2

Butter Crunch Lettuce

All water was taken from the reverse osmosis water purification system

All water was treated with 2 ml/L food grade hydrogen peroxide and left to sit 20 minutes before any fertilizer is mixed.

Planting

Day 1—Mix fertilizer with water at a dilution rate of 389 ppm, adjust the solution to a 5.8 pH. Re-hydrate from the bottom using fresh water only; adjust the pH to 5.8. The peat pucks should be moist but not soaking wet. Once the peat pucks are no longer moist to the touch re-hydrate using the same solution as Day 1.

Transplanting into the Sphere

Day 5 Inserted peat puck into 3" Rock wool cubes and secured to the needles using the locking rings. Use a fertilizer mix of 100 ppm at 6.3 pH.

In the Sphere

Day 6-10 pH maintained at 5.9 and 150 ppm fertilizer. Water at a rate of 1 gallon per day.

Day 11-15 pH maintained at 5.9 and 250 ppm fertilizer. Water at a rate of 1 gallon per day.

Day 16-18 pH maintained at 5.9 and 300 ppm fertilizer. Water at a rate of 1 gallon per day.

Day 19-24 pH maintained at 5.9 and 450 ppm fertilizer. Water at a rate of 1 gallon per day.

Day 25-30 pH maintained at 5.9 and 550 ppm fertilizer. Water at a rate of 1 gallon per day.

Day 31-40 pH maintained at 5.9 and 650 ppm fertilizer. Water at a rate of 1 gallon per day.

Day 41-50 pH maintained at 5.9 and 720 ppm fertilizer. Water at a rate of 1 gallon per day.

Day 51-55 Fresh water flush with a pH of 5.8; harvested plants.

Example 3

Green Leaf Lettuce

All water was taken from the reverse osmosis water purification system

All water was treated with 2 ml/L food grade hydrogen peroxide and left to sit 20 minutes before any fertilizer is mixed.

Planting

Day 1—Mix fertilizer with water at a dilution rate of 389 ppm, adjust the solution to a 5.8 pH. Re-hydrate from the bottom using fresh water only; adjust the pH to 5.8. The peat pucks should be moist but not soaking wet. Once the peat pucks are no longer moist to the touch re-hydrate using the same solution as Day 1.

Transplanting into the Sphere

Day 5 Inserted peat puck into 3" Rock wool cubes and secured to the needles using the locking rings. Use a fertilizer mix of 100 ppm at 5.8 pH.

In the Sphere

Day 6-10 pH maintained at 5.9 and 150 ppm fertilizer. Water at a rate of 1 gallon per day.

Day 11-15 pH maintained at 5.9 and 300 ppm fertilizer. Water at a rate of 1 gallon per day.

Day 16-20 pH maintained at 5.9 and 400 ppm fertilizer. Water at a rate of 1 gallon per day.

Day 21-24 pH maintained at 5.9 and 500 ppm fertilizer. Water at a rate of 1.5 gallons per day.

Day 25-30 pH maintained at 5.9 and 550 ppm fertilizer. Water at a rate of 2 gallons per day.

Day 31-40 pH maintained at 5.9 and 600 ppm fertilizer. Water at a rate of 2 gallons per day.

Day 41-45 Fresh water flush at a pH of 5.8; harvested plants.

Example 4

Romaine

All water was taken from the reverse osmosis water purification system

All water was treated with 2 ml/L food grade hydrogen peroxide and left to sit 20 minutes before any fertilizer is mixed.

Planting

Day 1—Mix fertilizer with water at a dilution rate of 389 ppm, adjust the solution to a 5.8 pH. Re-hydrate from the bottom using fresh water only; adjust the pH to 5.8. The peat pucks should be moist but not soaking wet. Once the peat pucks are no longer moist to the touch re-hydrate using the same solution as Day 1.

Transplanting into the Sphere

Day 8 Inserted pear puck into 3" Rock wool cubes and secured to the needles using the locking rings. A fertilizer mix of 100 ppm at 5.5 pH was used In the Sphere Day 9-10: 100 ppm fertilizer at 5.5 pH was used. The plants were watered twice daily.

Day 11: 200 ppm fertilizer was used at 5.5 pH.

Day 12-20: The fertilizer was reduced to 180 ppm and pH was adjusted to 5.8 Day 13 The plants were flushed with fresh water at a pH of 5.8.

Day 21: 200 ppm fertilizer was used at 5.5 pH.

Day 22-29: 210 ppm fertilizer was used at 5.5 pH.

Day 30-39: 250 ppm fertilizer was used at 6.2 pH. Watering was increased to three times daily.

Day 40-41: 280 ppm fertilizer was used at 5.5 pH.

Day 42-45: Plants were flushed with fresh water.

Day 46: Harvested 96 heads of winter density romaine lettuce. Nice green leaves with good texture and flavor.

Example 5

Safflower

All water was taken from the reverse osmosis water purification system

All water was treated with 2 ml/L food grade hydrogen peroxide and left to sit 20 minutes before any fertilizer is mixed.

Planting

Day 1—Mix fertilizer with water at a dilution rate of 389 ppm, adjust the solution to a 5.8 pH. Re-hydrate from the bottom using fresh water only; adjust the pH to 5.8. The peat pucks should be moist but not soaking wet. Once the peat pucks are no longer moist to the touch re-hydrate using the same solution as Day 1.

Transplanting into the Sphere

Day 5 Inserted pear puck into 3" Rock wool cubes and secured to the needles using the locking rings. Use a fertilizer mix of 100 ppm at 5.8 pH.

In the Sphere

Day 6-7 pH maintained at 5.8 and 100 ppm fertilizer. Water at a rate of 1 gallon per day.

Day 8-12 pH maintained at 5.8 and 200 ppm fertilizer.

Day 13-15 pH maintained at 5.8 and 600 ppm fertilizer.

Day 16-22 pH maintained at 5.8 and 800 ppm fertilizer.

Day 23-29 The same as day 16-22 but the water is increased to 2 gallons/day.

Day 30-93 pH maintained at 5.8 and 1200 ppm fertilizer.
Day 94-97 The plants are flushed with pure water at a pH of 4.5.
Day 98 Harvested the crop.

Example 6

Spinach

All water was taken from the reverse osmosis water purification system

All water was treated with 2 ml/L food grade hydrogen peroxide and left to sit 20 minutes before any fertilizer is mixed.

Planting

Day 1—Mix fertilizer with water at a dilution rate of 389 ppm, adjust the solution to a 5.8 pH. Re-hydrate from the bottom using fresh water only; adjust the pH to 5.8. The peat pucks should be moist but not soaking wet. Once the peat pucks are no longer moist to the touch re-hydrate using the same solution as Day 1.

Transplanting into the Sphere

Day 9 Inserted pear puck into 3" Rock wool cubes and secured to the needles using the locking rings. Use a fertilizer mix of 100 ppm at 5.5 pH.

In the Sphere

Day 10-13 pH maintained at 6.2 and 100 ppm fertilizer. Water at a rate of 1 gallon per day.
Day 14-16 pH maintained at 6.2 and 110 ppm fertilizer. Water at a rate of 1 gallon per day.
Day 17-29 pH maintained at 6.2 and 130 ppm fertilizer. Water at a rate of 1 gallon per day.
Day 30-32 pH maintained at 6.2 and 200 ppm fertilizer. Water at a rate of 1 gallon per day.
Day 33-36 pH maintained at 6.2 and 250 ppm fertilizer. Water at a rate of 1 gallon per day.
Day 37-42 pH maintained at 6.2 and 220 ppm fertilizer. Water at a rate of 1 gallon per day.
Day 43-48 Flush with fresh water twice daily at a pH of 6.2; harvested plants.

Example 7

Basil

All water was taken from the reverse osmosis water purification system

All water was treated with 2 ml/L food grade hydrogen peroxide and left to sit 20 minutes before any fertilizer is mixed.

Planting

Day 1—Mix fertilizer with water at a dilution rate of 389 ppm, adjust the solution to a 5.8 pH. Re-hydrate from the bottom using fresh water only; adjust the pH to 5.8. The peat pucks should be moist but not soaking wet. Once the peat pucks are no longer moist to the touch re-hydrate using the same solution as Day 1.

Transplanting into the Sphere

Day 5 Inserted pear puck into 3" Rock wool cubes and secured to the needles using the locking rings. Use a fertilizer mix of 100 ppm at 5.8 pH.

In the Sphere

Day 6-7 pH maintained at 5.8 and 100 ppm fertilizer. Water at a rate of 1 gallon per day.
Day 8-12 pH maintained at 5.8 and 200 ppm fertilizer.
Day 13-15 pH maintained at 5.8 and 400 ppm fertilizer. Water at a rate of 1.5 gallons per day.
Day 16-22 pH maintained at 5.8 and 600 ppm fertilizer.
Day 23-26 pH maintained at 5.8 and 800 ppm fertilizer. Water at a rate of 2 gallons per day.
Day 27-30 pH maintained at 5.8 and 1000 ppm fertilizer.
Day 31-34 Fresh water only to flush the salts from the plants.
Day 35—Harvested the plants.

Examples 8-10

FIGS. 1-3 and 15-23

In these examples, the GroTek Complete Feed Program, available from GroTek Manufacturing, Inc. 284-505-8840-210th Street, Langley, B.C. V1M 2Y2, Canada was used. General information is available from the GroTek website: http://www.GroTek.net/default.asp.

Mixing charts for the Feed Program are available at: http://www.GroTek.net/products/charts/complete.asp.

Components of the Feed Program used in these examples are as follows:

1. Fertilizers

For germination—GroTek Kick Start rooting solution 1-2-1 (these numbers refer to the parts of nitrogen-phosphorus-potassium, or N—P—K, in each formulation).

Formulations for GroTek's Tek.123 fertilizers are given below; other formulations are available from the manufacturer.

| Grow | | Bloom | |
| --- | --- | --- | --- |
| Tek.123 Grow 1 | 4-0-6 | Tek.123 Grow 1 | 4-0-6 |
| Tek.123 Micro 2 | 3-0-2 | Tek.123 Micro 2 | 3-0-2 |
| Tek.123 Bloom 3 | 0-6-5 | Tek.123 Bloom 3 | 0-6-5 |

2. Supplements

| Grow | | Bloom | |
| --- | --- | --- | --- |
| Bud Fuel | 0-0-2 | Bud Fuel | 0-0-2 |
| Monster Grow | 20-40-0 | Vita Max | 1-1-2 |
| Organic Fusion Grow | 1-0-2 | Monster Bloom | 0-50-30 |
| Rage | 1-0-0 | Blossom Blaster | 0-39-25 |
| LXR Gold | 0-1-0 | Organic Fusion Bloom | 0-1-2 |
| | | Heavy Bud | 0-1-2 |
| | | Rage | 1-0-0 |
| | | LXR Gold | 0-1-1 |
| | | Formula 1 | 0-2-4 |

3. Conditioners

| Grow | Bloom |
| --- | --- |
| Hydrozyme | Hydrozyme |
| Final Flush | MM 2000 |
| | Final Flush |

Fertilizers, supplements, and conditioners were mixed according to the manufactures recommendations available at http://www.GroTek.net/products/charts/complete.asp Examples 8-10 followed the manufactures feed program protocol. Example 9 (basil) was repeated and the mixture of supplements was altered as indicated.

GroTek fertilizer formulations:

| TEK.123 Grow 1 | |
| --- | --- |
| Total nitrogen | 4% |
| 3.7% nitrate nitrogen | |
| 0.3% ammoniacal nitrogen | |
| Soluble potash | 6% |
| Magnesium (Mg) | 0.5% |
| Mixed at 15 ml/gallon | |

| TEK.123 Micro 2 | |
| --- | --- |
| Total nitrogen | 3.0% |
| 2.8% nitrate nitrogen | |
| 0.2% ammoniacal nitrogen | |
| Soluble potash | 2.0% |
| Calcium (Ca) | 3.0% |
| Iron (Fe) | 0.2% |
| 0.2% chelated iron | |
| Manganese (Mn) | 0.05% |
| 0.05% chelated Mn | |
| Boron (B) | 0.02% |
| Mixed at 10 ml/gallon | |

| TEK.123 Bloom 3 | |
| --- | --- |
| Available phosphoric acid | 6.0% |
| Soluble potash | 5.0% |
| Magnesium (Mg) | 0.5% |
| Sulfur (S) | 3.0% |
| Mixed at 5 ml/gallon | |

Example 8

Arugula

All water was taken from the reverse osmosis water purification system.

All water was treated with 2 ml/L food grade hydrogen peroxide and left to sit 20 minutes before any fertilizer is mixed.

Flush for 12 hours with fresh water between week fertilizer changes

Carbon dioxide was set at 1500 ppm/24 hours a day during the first 16 days and 1200 ppm/16 hours a day for all 25 days in the sphere. Carbon dioxide was run only while the lights were on.

For seed sprouting used GroTek Kick Start fertilizer. For growing used GroTek's complete GroTek feed program Planting Day 1—Mixed fertilizer with water at a dilution rate of 389 ppm; Adjusted the solution to a 5.8 pH. Re-hydrate from the bottom using fresh water only. Adjusted the pH to 5.8. The peat pucks should be moist but not soaking wet. Once the peat pucks are no longer moist to the touch re-hydrate using the same solution as Day 1.

Transplanting into the Sphere

Day 16—Fill each rib with 12 plants. Do this 32 times for each sphere to be used. Attach the water lines and install a 400-Watt High Pressure Sodium lamp. Adjusted the ambient temperature so the inside of the sphere 10" above lamp is 76 F during the day and 68 F at night. Set photoperiod at 14 hours. A pump rated at 1350 GPM High Pressure is used for all watering times listed.

In the Sphere

Day 1-7 Mixed water and nutrients for week one and diluted to 300 ppm. Raised the ppm to a max of 450 ppm over week one. Adjusted the pH to 6.1 set the timer to run the pump 0.5 seconds the first time the system is engaged and then once 36 hours later at a rate of 0.12 seconds. Then run the pump 0.13 seconds every hour during the day and 0.1 seconds three times during the night.

Day 8-15 Mixed water and nutrients for week two and diluted to 450 ppm. Raised to a max of 600 ppm over week 2. Adjusted the pH to 6.2 set the timer to run the pump 0.13 seconds every hour during the day and 0.1 seconds three times during the night.

Day 16-21 Mixed water and nutrients for week three and diluted to 600 ppm. Raised to a max of 720 ppm over the week. Adjusted the pH to 6.4 set the timer to run the pump 0.19 seconds every hour during the day and 0.19 seconds every 140 minutes during the night.

Day 22-24 Mixed water and nutrients for week three and diluted to 720 ppm. Adjusted the pH to 6.4. On Day 23 did not add micronutrients. Set the timer to run the pump 1.20 seconds every hour during the day and 0.19 seconds every 140 minutes during the night.

Day 25—Mixed GroTek's The Final Flush fertilizer rinse solution at a rate of 10 ml per 5 liters of water. Adjusted the pH to 6.2 set the timer to run the pump 1.10 seconds every hour during the day and 0.19 seconds every 140 minutes during the night.

Harvest

Trimmed plants to 2.5" from the top of the peat puck holder to allow for re-growth. Start back on a day seven feeding schedule for the first seven days and continued the regular feeding schedule after this period.

Example 9

Sweet Basil

All water was taken from the reverse osmosis water purification system

All water was treated with 2 ml/L food grade hydrogen peroxide and left to sit 20 minutes before any fertilizer is mixed.

Flush for 12 hours with fresh water between week fertilizer changes

Carbon dioxide was set at 1500 ppm/24 hours a day during the first 16 days and 1200 ppm/16 hours a day for all 25 days in the sphere. Carbon dioxide was run only while the lights were on.

For seed sprouting used GroTek Kick Start fertilizer. For growing used GroTek's complete GroTek feed program.

Planting

Day 1—Mixed fertilizer with water at a dilution rate of 389 ppm; Adjusted the solution to a 5.8 pH. Re-hydrate from the bottom using fresh water only. Adjusted the pH to 5.8. The peat pucks should be moist but not soaking wet. Once the peat pucks are no longer moist to the touch re-hydrate using the same solution as Day 1.

Transplanting into the Sphere

Day—16 Hydrated 192 peat pucks for each sphere to be transplanted. Inserted one peat puck into one peat puck holder. Inserted six plants into a mechanical medium starting at the water injection end of each rib. Filled the first hole with a plant leaving one open hole between each plant. Filled each open hole with one peat puck holder from the freshly hydrated peat pucks. This will be known as m1. Did this 16 times for each spheres used. Next, inserted six of the freshly hydrated peat pucks in the peat puck holders into the mechanical medium starting at the rib end the water is injected into. Leave one open hole between each. Filled the open holes with a plant. This will be known as m2. Did this 16 times for every sphere to be used. Attach the mediums to a sphere frame using an alternating pattern of m1, m2. Attached the water lines and installed a 1000-Watt high pressure sodium lamp. Adjusted the ambient temperature of the inside of the sphere 10" above the lamp at 80 F during the day and 68 F at night. The photoperiod was set at 16 hours. A pump rated at 1350 GPH High Pressure is used for all watering times listed.

In the Sphere

Day 1-7 Mixed water and nutrients for week one and diluted to 389 ppm raising the ppm to 500 over the 7 days. Keep the pH at 6.2 run the pump 0.13 seconds every hour during the day and 0.1 seconds three times during the night.

Day 8-15 Mixed water and nutrients for week two and diluted to 500 ppm and raised to a max of 800 ppm over the 7 days. Keep the pH at 6.3 run the pump 0.18 seconds every hour during the day and 0.15 seconds three times during the night.

Day 16-21 Mixed water and nutrients for week three diluted to 800 ppm and raised to a max of 880 ppm over the 7 days. Keep the pH at 6.4 run the pump 0.19 seconds every hour during the day and 0.19 seconds every 140 minutes during the night.

Day 22-24 Mixed water and nutrients for week three and diluted to 850 ppm. On Day 23 did not add micronutrients. Set the timer to run the pump 1.20 seconds every hour during the day and 0.19 seconds every 140 minutes during the night run the pump 1.20 seconds every hour during the day and 0.19 seconds every 140 minutes during the night.

Day—25 Mixed GroTek's The Final Flush fertilizer rinse solution at a rate of 10 ml per 5 liters of water. Adjusted the pH to 6.2 set the timer to run the pump 1.10 seconds every hour during the day and 0.19 seconds every 140 minutes during the night.

Example 9 followed GroTek's protocol including Monster Grow supplement during week one, two Tek.123 fertilizer mixes for the first 16 days and then Bud Fuel supplement for the remaining time. Example 9 was repeated altering the GroTek protocol by using Monster Grow supplement for the first five days, Bud Fuel supplement for the next three days and then back to Monster Grow for the next five days. On day thirteen the supplements were once again switched to Bud Fuel for three days then back to Monster Grow for final four days. Crop yield for the second run of Example 9 was 7.4 pounds of fresh basil in 20 days with an average weight of 25.25 g per plant compared to 6.7 pounds of basil after 25 days with an average weight of 21 g per plant for the first run.

Example 10

Red Oak Leaf Lettuce

All water was taken from the reverse osmosis water purification system

All water was treated with 2 ml/L food grade hydrogen peroxide and left to sit 20 minutes before any fertilizer is mixed.

Flush for 12 hours with fresh water between week fertilizer changes

Carbon dioxide was set at 1500 ppm/24 hours a day during the first 16 days and 1200 ppm/16 hours a day for all 25 days in the sphere. Carbon dioxide was run only while the lights were on.

For seed sprouting used GroTek Kick Start fertilizer. For growing used GroTek's complete GroTek feed program.

Planting

Day 1—Mixed fertilizer with water at a dilution rate of 389 ppm; Adjusted the solution to a 5.8 pH. Re-hydrate from the bottom using fresh water only. Adjusted the pH to 5.8. The peat pucks should be moist but not soaking wet. Once the peat pucks are no longer moist to the touch re-hydrate using the same solution as Day 1.

Transplanting into the Sphere

Day—16 Hydrated 192 peat pucks for each sphere to be transplanted. Inserted one peat puck into one peat puck holder. Inserted six plants into a mechanical medium starting at the water injection end of each rib. Filled the first hole with a plant leaving one open hole between each plant. Filled each open hole with one peat puck holder from the freshly hydrated peat pucks. This will be known as m1. Did this 16 times for each spheres used. Next, inserted six of the freshly hydrated peat pucks in the peat puck holders into the mechanical medium starting at the rib end the water is injected into. Leave one open hole between each. Filled the open holes with a plant. This will be known as m2. Did this 16 times for every sphere to be used. Attach the mediums to a sphere frame using an alternating pattern of m1, m2. Attached the water lines and installed a 1000-Watt high pressure sodium lamp. Adjusted the ambient temperature of the inside of the sphere 10" above the lamp at 80 F during the day and 68 F at night. The photoperiod was set at 16 hours. A pump rated at 1350 GPH High Pressure is used for all watering times listed.

In the Sphere

Day 1-7 Mixed water and nutrients for week one and diluted to 300 ppm. Raised to a max of 500 ppm over the week. Adjusted the pH to 5.8 set the timer to run the pump 0.5 seconds the first time the system is engaged and then once 36 hours later at a rate of 0.12 seconds. Run the pump 0.13 seconds every hour during the day and 0.1 seconds three times during the night.

Day 8-15 Mixed water and nutrients for week two and diluted to 560 ppm. Raised to a max of 600 ppm over the week. Adjusted the pH to 5.9 set the timer to run the pump 0.18 seconds every hour during the day and 0.15 seconds three times during the night set the timer to run the pump 0.15 seconds every hour during the day and 0.13 seconds every 140 minutes during the night.

Day 16-21 Mixed water and nutrients for week three and diluted to 620 ppm. Raised to a max of 800 ppm over the week. Adjusted the pH to 5.9 set the timer to run the pump 0.19 seconds every hour during the day and 0.19 seconds every 140 minutes during the night.

Day—22 to 23 Mixed water and nutrients for week three and diluted to 800 ppm. Adjusted the pH to 5.9. On Day 23 did not add micronutrients. Set the timer to run the pump 1.20 seconds every hour during the day and 0.19 seconds every 140 minutes during the night.

Day—24 Used water only. Adjusted the pH to 5.8 set the timer to run the pump 1.20 seconds every hour during the day and 0.00 seconds during the night.

Day—25 Mixed GroTek's Final Flush fertilizer rinse solution at a rate of 10 ml per 5 liters of water. Adjusted the pH to 5.8 set the timer to run the pump 1.10 seconds every hour during the day and 0.19 seconds every 140 minutes during the night.

Summary

Examples 8-10

| Crop | Days to Harvest | Yield |
| --- | --- | --- |
| Basil | 25 days in the sphere | 6.7 lbs. |
| Arugula | 25 days in the sphere | 5 lbs. |
| Red Leaf Lettuce | 25 days in the sphere | 24 lbs. |

While this invention has been described as having preferred sequences, ranges, steps, materials, structures, components, features, and/or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth and fall within the scope of the invention and of the limits of the appended claims.

What is claimed is:

1. A method for growing plants, which comprises:
   (a) providing a vertical carousel of contiguous, intermeshing horizontal arrays capable of moving together, each of said arrays comprising a plurality of spaced apart arcuate ribs lying on circumferential lines that pass thru the horizontal axis of a sphere, said ribs carrying plants that grow towards a growth promoting light source at the center of each array which is operable during periods of plant growth and non-growth, the ribs of one array intermeshing with the spaced apart ribs of contiguous arrays
   (b) rotating one of said arrays thereby causing all of the contiguous intermeshing arrays to rotate together at the same speed;
   (c) moving the arrays in the carousel together from a drive position in which said one array is rotated to an unloading/loading position in which said one array is not rotated; and
   (d) watering all the plants in an array at the same time while the arrays are rotating to maintain even weight distribution within each array for smooth, balanced rotation.

2. The method of claim 1, wherein said carousel moves in a noncircular path.

3. The method of claim 1, wherein the rate of rotation and the intervals, amounts and rates of delivery of water optionally containing plant nutrients are selected for optimum plant growth towards said light source.

4. The method of claim 1, wherein the light source is a light emitting diode.

5. The method of claim 1, wherein water optionally containing plant nutrients is delivered to the plants without recirculation.

6. The method of claim 1, wherein the plants grown are selected from the group of leafy vegetables, green vegetables, fruits and berries.

7. The method of claim 1, wherein the plants grown are selected from the group of basil, safflower, Arugula, Artemisia, lettuce and spinach.

8. The method of claim 1, wherein a root enzyme is added to the water.

9. The method of claim 1, wherein pollen is dislodged from flowering plants and distributed to other flowering plants in an array.

10. An apparatus for growing plants, comprising:
    (a) a vertical carousel of contiguous, intermeshing horizontal arrays capable of moving together, each of said arrays comprising a plurality of spaced apart arcuate ribs lying on circumferential lines that pass thru the horizontal axis of a sphere, said ribs carrying plants that grow towards a growth promoting light source at the center of each array which is operable during periods of plant growth and non-growth, the ribs of one array intermeshing with the spaced apart ribs of contiguous arrays;
    (b) means to rotate one of said arrays thereby causing all of the contiguous intermeshing arrays in the carousel to rotate together at the same speed;
    (c) means to move the arrays in the carousel together from a drive position in which said means to rotate said one array is engaged to an unloading/loading position in which said means to rotate is disengaged; and
    (d) means to water all the plants in an array at the same time while the arrays are rotated to maintain even weight distribution within each array for smooth, balanced rotation.

11. The apparatus of claim 10, wherein said carousel moves in a noncircular path.

12. The apparatus of claim 10, wherein the light source is a light emitting diode.

13. The apparatus of claim 10, which includes means to dislodge and distribute pollen from flowering plants to other flowering plants in a spherical array.

14. A method for growing plants, wherein:
    (a) a vertical carousel of contiguous, intermeshing horizontal arrays capable of moving together is provided, each of said arrays carrying plants on the interior thereof that grow towards a growth promoting light source at the center of each array which is operable during periods of plant growth and non-growth, the exteriors of one array being adapted to intermesh with the exteriors of contiguous arrays;
    (b) one of said arrays is rotated thereby causing all of the intermeshing arrays to rotate together at the same speed;
    (c) the arrays are moved in the carousel together from a drive position in which said one array is rotated to an unloading/loading position in which said one array is not rotated;
    (d) all the plants in an array are watered at the same time while the arrays are rotating to maintain even weight distribution within each array for smooth, balanced rotation; and
    (e) using each of said arrays by providing a plurality of spaced apart arcuate ribs lying on circumferential lines that pass thru the horizontal axis of a sphere, the ribs of one array intermeshing with the spaced apart ribs of contiguous arrays.

15. The method of claim 14, wherein said carousel moves in a noncircular path.

16. An apparatus for growing plants, comprising:
(a) a vertical carousel of contiguous, intermeshing horizontal arrays capable of moving together, each of said arrays carrying plants on the interior thereof that grow towards a growth promoting light source at the center of each array which is operable during periods of plant growth and non-growth, the exteriors of each array intermeshing with contiguous arrays;
(b) means to rotate one of said arrays thereby causing all of the contiguous intermeshing arrays in the carousel to rotate together at the same speed;
(c) means to move the arrays in the carousel together from a drive position in which said means to rotate said one array is engaged to an unloading/loading position in which said means to rotate is disengaged
(d) means to water all the plants in an array at the same time while the arrays are rotated to maintain even weight distribution within each array for smooth, balanced rotation; and
(e) said arrays comprise a plurality of spaced apart arcuate ribs lying on circumferential lines that pass thru the horizontal axis of a sphere, the ribs of one array intermeshing with the spaced apart ribs of contiguous arrays.

17. The apparatus of claim 16, wherein said carousel moves in a noncircular path.

* * * * *